(12) United States Patent
Toba et al.

(10) Patent No.: US 9,684,824 B2
(45) Date of Patent: Jun. 20, 2017

(54) MOTION ESTIMATION DEVICE, ROBOT, AND METHOD TO ESTIMATE REACTION OF A PERSON

(71) Applicant: HONDA MOTOR CO., LTD., Tokyo (JP)

(72) Inventors: Kaoru Toba, Wako (JP); Yoshihisa Ohara, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 37 days.

(21) Appl. No.: 14/644,491

(22) Filed: Mar. 11, 2015

(65) Prior Publication Data
US 2015/0262003 A1 Sep. 17, 2015

(30) Foreign Application Priority Data

Mar. 14, 2014 (JP) ................................ 2014-052295
Mar. 9, 2015 (JP) ................................ 2015-046241

(51) Int. Cl.
*G06K 9/00* (2006.01)
*G06T 7/73* (2017.01)

(52) U.S. Cl.
CPC ..... *G06K 9/00355* (2013.01); *G06K 9/00771* (2013.01); *G06T 7/73* (2017.01); *G06T 2207/10028* (2013.01); *G06T 2207/30196* (2013.01)

(58) Field of Classification Search
CPC ...... G06K 9/00355; G06T 2207/30196; G06T 7/004; G06T 7/20
See application file for complete search history.

(56) References Cited

U.S. PATENT DOCUMENTS

| 2003/0113018 | A1* | 6/2003 | Nefian | G06F 3/017 382/181 |
| 2004/0190776 | A1* | 9/2004 | Higaki | G06K 9/00375 382/190 |
| 2008/0052643 | A1* | 2/2008 | Ike | G06F 3/017 715/863 |
| 2008/0178126 | A1* | 7/2008 | Beeck | G06F 3/017 715/863 |

(Continued)

FOREIGN PATENT DOCUMENTS

| CN | 102474592 | 5/2012 |
| CN | 102509092 | 6/2012 |

(Continued)

OTHER PUBLICATIONS

Duan et al., Detection of hand-raising gestures based on body silhouette analysis, Feb. 2009, IEEE International Conference on Robotics and Biomimetics, pp. 1756-1761.*

(Continued)

*Primary Examiner* — Vu Le
*Assistant Examiner* — Guillermo Rivera-Martinez
(74) *Attorney, Agent, or Firm* — Rankin, Hill & Clark LLP

(57) ABSTRACT

A motion estimation device includes an acquisition unit configured to acquire a distance between a sensor and an object and a situation estimation unit configured to estimate a person's reaction based on a distance acquired by the acquisition unit at a first time that is set based on a time when a person is being urged to stop raising his/her hand.

10 Claims, 17 Drawing Sheets

(56) References Cited

U.S. PATENT DOCUMENTS

| | | | | |
|---|---|---|---|---|
| 2009/0010490 | A1* | 1/2009 | Wang | G06K 9/00771 |
| | | | | 382/103 |
| 2009/0079813 | A1* | 3/2009 | Hildreth | H04N 7/147 |
| | | | | 348/14.03 |
| 2010/0275159 | A1* | 10/2010 | Matsubara | G06F 3/011 |
| | | | | 715/810 |
| 2010/0281432 | A1* | 11/2010 | Geisner | G06F 3/011 |
| | | | | 715/849 |
| 2011/0141486 | A1* | 6/2011 | Wada | G06F 3/011 |
| | | | | 356/614 |
| 2011/0154266 | A1* | 6/2011 | Friend | A63F 13/06 |
| | | | | 715/863 |
| 2011/0239118 | A1* | 9/2011 | Yamaoka | G06F 3/017 |
| | | | | 715/709 |
| 2011/0289456 | A1* | 11/2011 | Reville | G06F 3/017 |
| | | | | 715/830 |
| 2012/0194697 | A1* | 8/2012 | Hasegawa | G06K 9/00355 |
| | | | | 348/223.1 |
| 2014/0267008 | A1* | 9/2014 | Jain | G06F 3/017 |
| | | | | 345/156 |

FOREIGN PATENT DOCUMENTS

| | | |
|---|---|---|
| CN | 103019570 | 4/2013 |
| CN | 103279791 | 9/2013 |
| CN | 103543834 | 1/2014 |
| CN | 103544469 | 1/2014 |
| JP | 2006-099749 | 4/2006 |

OTHER PUBLICATIONS

Liu et al., Haar-Feature Based Gesture Detection of Hand-Raising for Mobile Robot in HRI Environments, 2010, CAAI International Conference on Advanced Intelligence, pp. 67-75.*

Nazare et al., Hand-Raising Gesture Detection with Lienhart-Maydt Method in Video conference and Distance Learning, 2013,CIARP 2013, Part II, LNCS 8259, pp. 512-519.*

Chinese Office Action with English translation dated May 4, 2016, 14 pages.

* cited by examiner

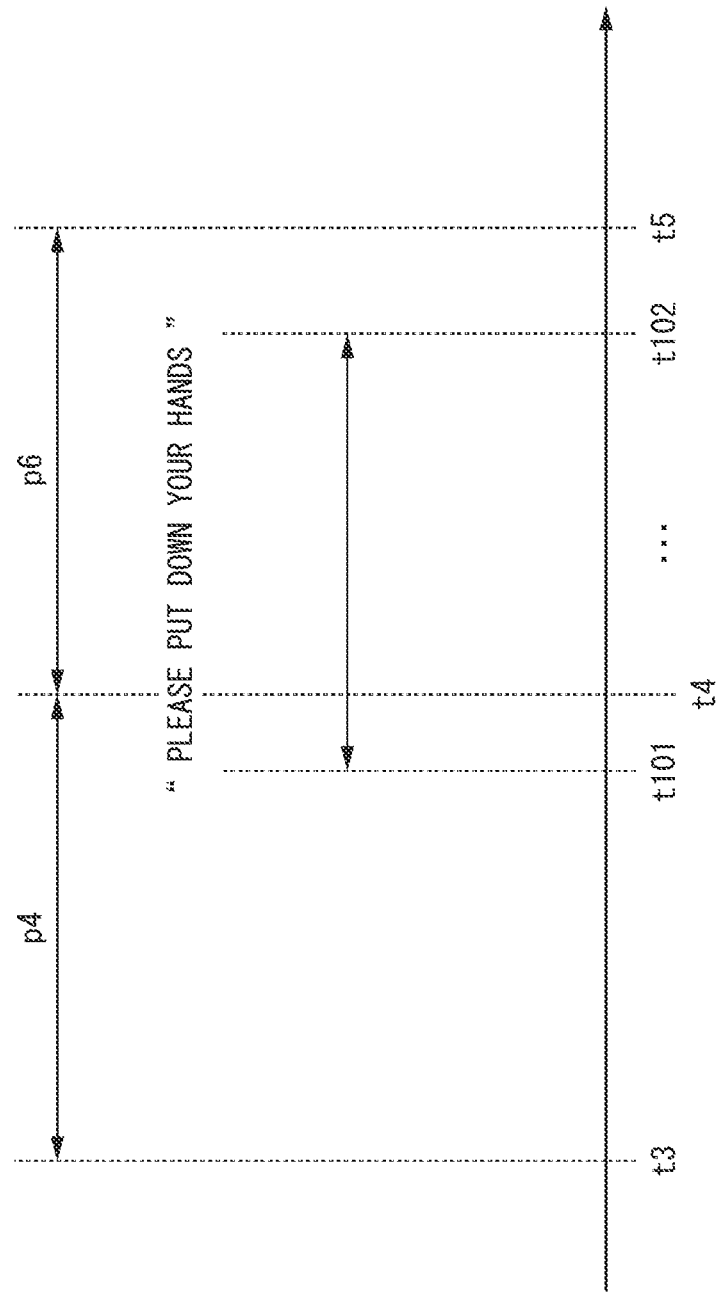

MOTION ESTIMATION DEVICE, ROBOT, AND METHOD TO ESTIMATE REACTION OF A PERSON

CROSS REFERENCE TO RELATED APPLICATIONS

Priority is claimed on Japanese Patent Application No. 2014-052295 filed on Mar. 14, 2014 and Japanese Patent Application No. 2015-046241 filed on Mar. 9, 2015, the contents of which are incorporated herein by reference.

BACKGROUND OF THE INVENTION

Field of the Invention

The present invention relates to a motion estimation device, a robot, and a motion estimation method.

Description of Related Art

Device (hereinafter referred to as a gesture recognition device) that recognizes gestures in which will and feelings are expressed by the movements of different parts of the body, such as arms, hands, fingers, feet, and a head, are proposed.

In such the gesture recognition device, an image of a specific part of a person who is present in a detection target area is extracted, based on an image that is generated by an imaging sensor and that has the value of the distance to an object present in the detection target area as a pixel value. Also, the gesture recognition device suggests that a predetermined gesture in a specific space is recognized, based on extracted time series data of the shape of a specific part. In addition, the specific part is, for example, a portion closer to a fingertip than a wrist of a person's hand, and the predetermined gesture is, for example, a motion of holding up a hand toward an imaging sensor (for example, refer to Japanese Unexamined Patent Application First Publication No. 2006-99749 (Patent Document 1)).

SUMMARY OF THE INVENTION

However, it is difficult for the gesture recognition device to predict, for example, a timing of the motion of holding up the hand toward the imaging sensor.

For this reason, in the technique described in Patent Document 1, there is a case where the gestures of a person who is present in the detection target area cannot be accurately recognized in a short time.

The invention has been made in view of the above problem, and an object thereof is to provide a motion estimation device, a robot, and a motion estimation method that can highly accurately detect the motions of a person who is present in a detection target area.

The invention has adopted the following aspects in order to solve the above problems and achieve the object concerned.

(1) A motion estimation device related to an aspect of the invention includes an acquisition unit configured to acquire a distance between a sensor and an object; and a situation estimation unit configured to estimate a person's reaction based on a distance acquired by the acquisition unit at a first time that is set based on a time when a person is being urged to stop raising his/her hand.

(2) As another aspect of the invention, in the motion estimation device of the above (1), the situation estimation unit may estimate a person's reaction based on a distance acquired by the acquisition unit in a first period that is set based on a time when a person is being urged to stop raising his/her hand.

(3) As another aspect of the invention, in the motion estimation device of the above (2), the situation estimation unit may extract distances of an object in a height direction at the first time and in the first period, and may compare the extracted distances in the height direction at the first time and in the first period with each other, thereby estimating a person's reaction.

(4) As still another aspect of the invention, the motion estimation device of the above (2) may further include an identifier applying unit configured to detect a person based on a distance acquired by the acquisition unit and applies an identifier to the detected person. The situation estimation unit may extract distances of the identifier in a height direction at the first time and in the first period by using the distance of the person to which the identifier is applied by the identifier applying unit, and compare the extracted distances of the identifier in the height direction at the first time and in the first period with each other, thereby estimating a person's reaction.

(5) As a still further aspect of the invention, the motion estimation device of the above (4) may further include a region distance processing unit configured to divide a predetermined range, in which a person's reaction is to be estimated, into one or more regions and obtain a distance of each of the divided regions based on a distance acquired by the acquisition unit. The situation estimation unit may estimate a person's reaction according to at least one distance out of the distance of the person to which the identifier is applied by the identifier applying unit and the distance obtained by the region distance processing unit.

(6) As a still further aspect of the invention, in the motion estimation device of the above (5), the region distance processing unit may extract distances of each of the divided regions in a height direction at the first time and in the first period, and compare values based on the extracted distances of each of the divided regions in the height direction at the first time and in the first period, thereby estimating a person's reaction.

(7) As a still further aspect of the invention, in the motion estimation device of the above (6), the values based on the distances of each of the divided regions in the height direction may be average values of distances in the height direction in a region from which the distances of each of the divided regions in the height direction at the first time and in the first period are extracted.

(8) As a still further aspect of the invention, the motion estimation device of any one of the above (5) to (7) may further include a distance tracking unit configured to track the distances of the identifiers applied by the identifier applying unit. The situation estimation unit may refer to the number of the identifiers given by the distance tracking unit, may estimate the person's reaction, using the distance obtained by the region distance processing unit, when the number of the identifiers that cannot be tracked in a predetermined period exceeds a predetermined value, and may estimate the person's reaction, using the distance obtained by the identifier applying unit, when the number of the identifiers that cannot be tracked in the predetermined period is smaller than a predetermined value.

(9) As a still further aspect of the invention, in the motion estimation device of any one of the above (5) to (8), the first time or the first period may be determined to correspond to a time when the change of the distance measured by the region distance processing unit becomes smaller than a predetermined value.

(10) As a still further aspect of the invention, in the motion estimation device of any one of the above (2) to (9), the situation estimation unit may calculate a hand raising presence range that is a range in the height direction, the hand raising presence range being calculated based on person physique data and a distance acquired by the acquisition unit in a second period during which a person does not raise his/her hand, and being where a person's hand is present when the person has raised his/her hand, may extract a distance which is present in the calculated hand raising presence range and is acquired by the acquisition unit at the first time or in the first period, and may estimate a person's reaction based on the extracted distance.

(11) As a still further aspect of the invention, in the motion estimation device of any one of the above (1) to (10), the person's reaction may be whether or not a person raises his/her hand, and the situation estimation unit may estimate persons' reactions at multiple times and may perform a majority decision based on the results estimated at the multiple times.

(12) As a still further aspect of the invention, the motion estimation device of any one of the above (1) to (11) may further include a sensor that performs measurement of a distance between itself and an object in a predetermined range.

(13) A robot related to an aspect of invention includes an output unit configured to output a signal indicating that a person is being urged to stop raising his/her hand; and the motion estimation device according to any one of the above (1) to (12).

(14) A motion estimation method related to an aspect of the invention includes an acquisition procedure in which an acquisition unit acquires a distance between a sensor and an object; and a situation estimation procedure in which a situation estimation unit estimates a person's reaction based on a distance acquired by the acquisition procedure at a first time that is set based on a time when a person is being urged to stop raising his/her hand.

According to the above aspects (1), (12), (13), and (14), a person's reaction can be precisely estimated in a short amount of time compared to a period during which a hand is raised.

According to the above aspects (2), (3), and (4), the number of persons who have raised their hands can be detected, based on the values in the height direction when the persons raise their hands in a period before the persons lower their hands, and the values in the height direction when the persons lower their hands.

According to the above aspects (5), (6), and (7), the period during which a hand is raised, and the amount of change in the height direction in a region when a hand is lowered can be estimated. Also, in the motion estimation device, which question has the greatest number of hands raised can be estimated by a majority vote based on the estimated results.

According to the above aspect (8), a person's reaction can be estimated using the distance obtained by the region distance processing unit or the distance obtained by the identifier applying unit, according to the detection results.

According to the above aspect (9), the first time that is set based on a time when people are being urged to stop raising their hand and the first period that is set based on a time when people are being urged to stop raising their hand can be determined based on the results detected by the region distance processing unit.

According to the above aspect (10), since it is not necessary to specify individuals, a person's reaction can be estimated even if a region crowded with persons is present.

According to the above aspect (11), a majority decision can be performed.

BRIEF DESCRIPTION OF THE DRAWINGS

FIG. 19 is a view illustrating a time when people are being urged to stop raising their hand, a first time, and a first period.

DETAILED DESCRIPTION OF THE INVENTION

First, the outline of the invention will be described.

A humanoid robot may perform the direction of a meeting, for example, in an event hall. In such a situation, the robot may be made to store scenarios, motions, and voice signals in advance, and the stored voice signals may be reproduced at timings according to a scenario while performing the stored motions. In such motions of the robot, it may be difficult to perform communication between persons who are present in the hall, and the robot.

For this reason, in the present embodiment, the communication between the robot and the persons is enriched as the robot selects a motion to be performed next or a voice signal to be output, according to the reactions of the persons who are present in the hall. In the present embodiment, as the robot estimates hand raising performed by the persons who are present in the hall, to perform a majority vote based on the estimated results, selection of a topic is performed from presented topics.

Hereinafter, embodiments of the invention will be described with reference to the drawings.

[First Embodiment]

Figure 1:
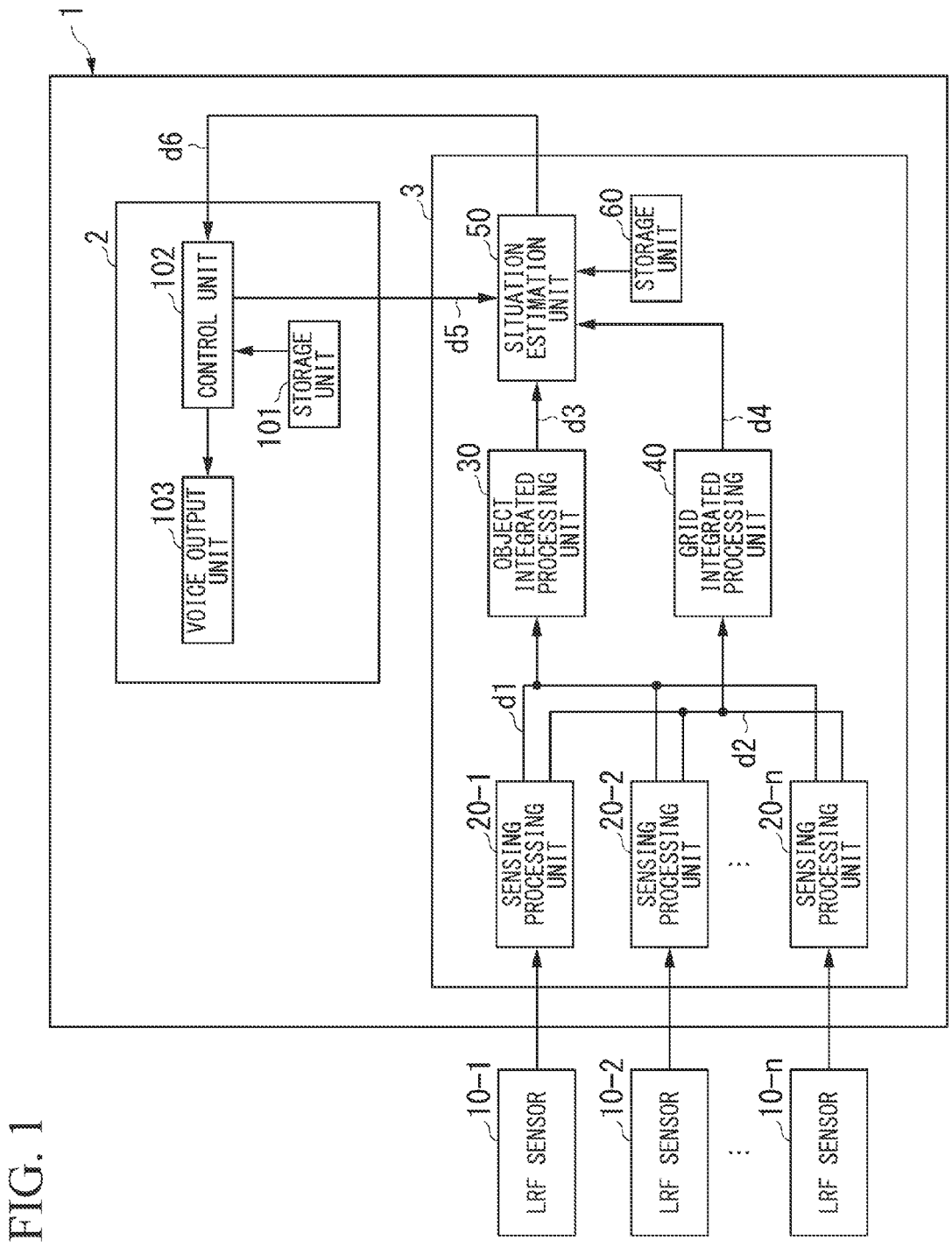
FIG. 1 is a block diagram of the outline of a robot related to a first embodiment of the invention.

FIG. 1 is a block diagram of the outline of a robot 1 related to the present embodiment.

As illustrated in FIG. 1, the robot 1 is configured to include a processing unit 2 and the motion estimation device 3. The robot 1 is connected to n (n is one or more integers) laser range finder (LRF) sensors 10-1 to 10-n by wire or wirelessly. In addition, a case where any one of the LRF sensors 10-1 to 10-n is not specified is referred to as LRF sensors 10. In addition, although an example in which the robot 1 includes the motion estimation device 3 will be described in the present embodiment, the invention is not limited to this. For example, a guide system or the like to be used in an event hall or the like may include the motion estimation device 3.

The LRF sensors 10 are three-dimensional measurement range sensors that scan a space as a detection target at predetermined pitches while radiating laser light, to measure the time that is taken until the laser light is reflected by an object and is returned, thereby detecting the distance from the object and the direction of the object. The respective LRF sensors 10-1 to 10-n output information on distance measurement points, which is detection results including the distances of detected objects and the directions of the objects, to corresponding sensing processing units (acquisition units) 20-1 to 20-n. In addition, x-axis components, y-axis components, and z-axis components are included in the information on distance measurement points. The respective LRF sensors 10-1 to 10-n are installed at positions where persons can be looked down from, for example, in a ceiling, walls, or the like of a space as the detection target so that portions of the space as the detection target overlap each other. The wavelength of the laser light is, for example, 905 nm, 785 nm, or the like. Additionally, the scanning range of one LRF sensor 10 is, for example, 270 degrees in a horizontal plane, the step angle thereof is 0.25 degrees, and the number of steps thereof is 1080 steps. In addition, although an example in which the LRF sensors 10 are used as an example of the sensors will be described in the present embodiment, the sensors may be other sensors without being limited to the LRF sensors.

First, the configuration of the processing unit 2 will be described.

The processing unit 2 performs various kinds of control, such as the motions of the robot 1. The processing unit 2 includes a storage unit 101, the control unit 102, and a voice output unit 103.

Information on the control of the robot 1, voice output data, scenario information, and the like are stored in the storage unit 101. In addition, the scenario information is information stating that predetermined motions are to be performed at predetermined times.

The control unit 102 reads the scenario information stored in the storage unit 101, and causes a voice signal to be output from the voice output unit 103, based on the read scenario information. Additionally, the control unit 102 generates a trigger signal d5 at a timing at which the voice signal is output, and outputs the generated trigger signal d5 to the situation estimation unit 50. Additionally, the control unit 102 selects processing to be performed next from the scenario information, based on information (hereinafter referred to as detection information) d6 showing detection results input from the motion estimation device 3.

The voice output unit 103 outputs a voice signal according to the processing of the control unit 102. The voice output unit 103 is, for example, a loudspeaker.

Next, the configuration of the motion estimation device 3 will be described.

The motion estimation device 3 includes the n sensing processing units 20-1 to 20-n, an object integrated processing unit (an identifier applying unit, a distance tracking unit) 30, a grid integrated processing unit (region distance processing unit) 40, the situation estimation unit 50, and a storage unit 60. A case where any one of the sensing processing units 20-1 to 20-n is not specified is referred to as sensing processing units 20. Additionally, the respective LRF sensors 10-1 to 10-n are connected to the corresponding sensing processing units 20-1 to 20-n by wire or wirelessly. Additionally, the motion estimation device 3 may be configured to include the LRF sensors 10.

The sensing processing units 20 acquires the detection results output by the LRF sensors 10. The sensing processing units 20 sort (cluster) distance measurement points, for example in every predetermined cycle, using the detection results input from the LRF sensors 10. The sensing processing units 20 calculate the gravity center of each sorted cluster, and use the calculated gravity center as information indicating a position. The sensing processing units 20 extract the maximum value of the height of each sorted cluster and use the extracted maximum value as information indicating height. Then, the sensing processing units 20 associate the information indicating the position of each cluster with the information indicating the height of each cluster to generate person cluster data d1, and output the generated person cluster data d1 to the object integrated processing unit 30.

Additionally, the sensing processing units 20 sort the distance measurement points into predetermined grids, for example in every predetermined cycle, using the detection results input from the LRF sensors 10. The sensing processing units 20 extract the maximum value of the height of each sorted grid and use the extracted maximum value as information indicating height. Then, the sensing processing units 20 associate the information indicating the position of each grid with the information indicating the height of each grid to generate grid data d2, and output the generated grid data d2 to the grid integrated processing unit 40.

The sensing processing units 20 perform sorting of the distance measurement points, for example using a hierarchical technique, such as the shortest distance method, or a division optimization technique, such as the k-means method. The sensing processing units 20 detect distance measurement points, of which the values in a z-axis direction corresponding to height are within a predetermined range or are equal to or more than a predetermined height and which have a predetermined density on an xy plane, into one cluster. For example, the sensing processing units 20 perform hierarchical clustering with respect to distance measurement points projected on the xy plane, thereby sorting the obtained distance measurement points.

The object integrated processing unit 30 integrates the person cluster data d1 input from the respective sensing processing units 20-1 to 20-$n$. The object integrated processing unit 30 allocates an identifier (ID) to each person, using the integrated person cluster data. The object integrated processing unit 30 performs tracking (hereinafter referred to as ID tracking) with respect to the person cluster data to which IDs are allocated. In addition, the ID tracking is performed using, for example, the gravity centers of clusters obtained by projecting the distance measurement points on the xy plane and sorting the projected projection points, as will be described below. The object integrated processing unit 30 matches information (hereinafter also referred to as person positions) showing positions to which IDs are allocated, the person cluster data to which the IDs are allocated, and the allocated IDs, thereby generating person data. The object integrated processing unit 30 outputs the generated person data d3 to the situation estimation unit 50.

The grid integrated processing unit 40 integrates the grid data d2 input from the respective sensing processing units 20-1 to 20-$n$. The grid integrated processing unit 40 extracts the maximum value of the height of each grid, using the integrated grid data. Then, the grid integrated processing unit 40 counts the number of grids of which the height is extracted. The grid integrated processing unit 40 calculates the average value of the height of the grids in the grids of which the height is extracted, and outputs the calculated height to the situation estimation unit 50 as information d4 indicating grid height.

A trigger signal d5 based on the scenario information is input from the control unit 102 to the situation estimation unit 50. In addition, information indicating the types of voice signals to be described below may be included in the trigger signal d5. The situation estimation unit 50 detects the maximum value from the information indicating height included in the person data for each ID in a predetermined period (first period), using the person data d3 input from the object integrated processing unit 30, according to the input trigger signal d5. The situation estimation unit 50 causes the maximum value detected in the predetermined period to be stored as a first cluster height value of the ID in the storage unit 60.

Additionally, the situation estimation unit 50 detects the maximum value of the information indicating grid height in the predetermined period (first period), using the information d4 indicating grid height input from the grid integrated processing unit 40, according to the input trigger signal d5, and causes the maximum value detected in the predetermined period to be stored as a first grid height value in the storage unit 60.

The situation estimation unit 50 causes the information indicating height included in the person data for each ID to be stored in the storage unit 60 as the second cluster height value of the ID, at a predetermined time (first time), using the person data d3 input from the object integrated processing unit 30, according to the input trigger signal d5.

Additionally, the situation estimation unit 50 causes the maximum value of the information indicating grid height at the predetermined time to be stored as a second grid height value in the storage unit 60, according to the input trigger signal d5.

The situation estimation unit 50 reads the first cluster height value and the second cluster height value stored in the storage unit 60 for each ID, and compares the read first cluster height value with the read second cluster height value, thereby determining whether or not a hand is raised for each ID.

The situation estimation unit 50 determines that a hand is raised, for example, when a value obtained by subtracting the second cluster height value from the first cluster height value is equal to or more than a predetermined value. Otherwise, the situation estimation unit 50 determines that a hand is raised, for example, when a value obtained by dividing the first cluster height value by the second cluster height value is equal to or more than a predetermined value.

The first cluster height value, the second cluster height value, the first grid height value, and the second grid height value are stored in the storage unit 60.

Figure 2:
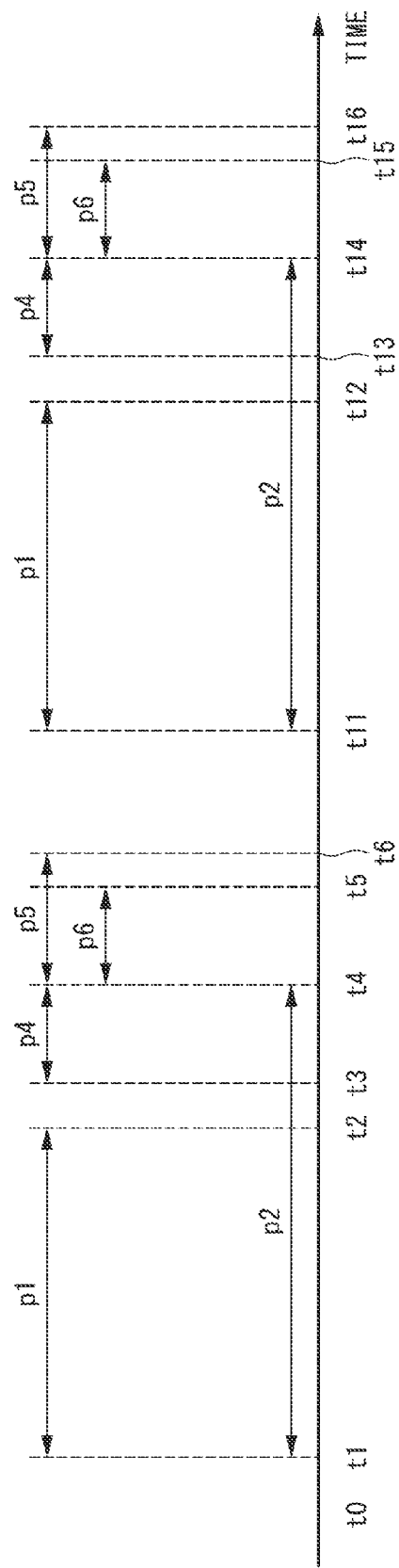
FIG. 2 is a view illustrating timings at which voice signals are output and timings at which hand raising is detected, related to the first embodiment.

FIG. 2 is a view illustrating timings at which voice signals are output and timings at which hand raising is detected, related to the present embodiment. In FIG. 2, the horizontal axis represents time. In addition, a case where the robot 1 poses two topics A and B is illustrated in the example illustrated in FIG. 2. First, timings at which the control unit 102 outputs voice signals will be described. At a time t0, persons hear a voice output from the robot 1. At this time, the persons do not raise their hands.

At a time t1, the control unit 102 starts to output a voice signal "People who want to hear A, please raise your hands" from the voice output unit 103, based on the scenario information stored in the storage unit 101.

Additionally, at a time t11, the control unit 102 starts to output a voice signal "People who want to hear B, please raise your hands" from the voice output unit 103, based on the scenario information stored in the storage unit 101. A period p1 is a period during which the voice signal started to be output at the time t1 or t11 has been output, and is a period of times t1 to t2 or times t11 to t12.

At a time t4 after the elapse of a period p2 from the time t1, the control unit 102 starts to output a voice signal "Yes, I see" from the voice output unit 103, based on the scenario information stored in the storage unit 101. Additionally, at a time t14 after the elapse of the period p2 from the time t11, the control unit 102 starts to output a voice signal "Yes, I see" from the voice output unit 103, based on the scenario information stored in the storage unit 101. The period p2 is a predetermined time from the time t1 or t11 that is set in the scenario information, and for example, is 10 seconds. Additionally, a period p5 is a period during which the voice signal started to be output at the time t4 or the time t14 has been output, and is a period of times t4 to t6 or times t14 to t16. Each of the time t4 and the time t14 is a time when people are being urged to stop raising their hand.

A time t3 is a time before a period p4 (first period) from the time t4. Additionally, a time t13 is a time before the period p4 from the time t14. The period p4 is, for example, ½ (of a predetermined time). For example, the predetermined time is for 4 seconds, and the period p4 is for 2 seconds. The object integrated processing unit 30 detects the cluster height for each ID during the period p4. Additionally, during this period p4, the grid integrated processing unit 40 detects the grid height of each grid, and calculates the average value of the grid height in all the grids of which the grid height is detected.

A time t5 is a time after a period p6 (first period) from the time t4. Additionally, a time t15 is a time before the period p6 from the time t14. The period p6 is, for example, ½ (of a predetermined time). For example, the predetermined time is for 4 seconds, and the period p6 is for 2 seconds. The object integrated processing unit 30 detects the cluster height for each ID at the time t5 and the time t15. Additionally, at the time t5 and the time t15, the grid integrated processing unit 40 detects the grid height of each grid, and calculates the average value of the grid height in all the grids of which the grid height is detected.

In the present embodiment, as illustrated in FIG. 2, the number of persons who have raised their hands is estimated as the situation estimation unit 50 compares the cluster height for each ID that is detected using the data during a period before the period p4 (first period) from the time t4 that is the timing at which the voice signal is output, with the cluster height that is detected using the data at a time after the period p6 (first period) from the time t4 (the data at a first time). Similarly, the number of persons who have raised their hands is estimated as the situation estimation unit 50 compares the cluster height for each ID that is detected using the data during a period before the period p4 from the time 114, with the cluster height that is detected using the data at a time after the period p6 from the time t14. Then, the control unit 102 performs a majority vote by comparing the number of persons who have raised their hands with respect to the questions A and B after the time t16.

Otherwise, the grid height is estimated as the situation estimation unit 50 compares the average value of the grid height, which is calculated using the data during a period before the period p4 from the time t4, with the average value of the grid height that is calculated using the data at a time after the period p6 from the time t4. Similarly, the grid height is estimated as the situation estimation unit 50 compares the average value of the grid height, which is calculated using the data during a period before the period p4 from the time t14, with the grid height that is calculated using the data at a time after the period p6 from the time t14. Then, the control unit 102 performs a majority vote by comparing the grid height with respect to the questions A and 13 after the time t16.

Next, the processing procedure of the hand-raising detection by the robot 1 will be described.

Figure 3:
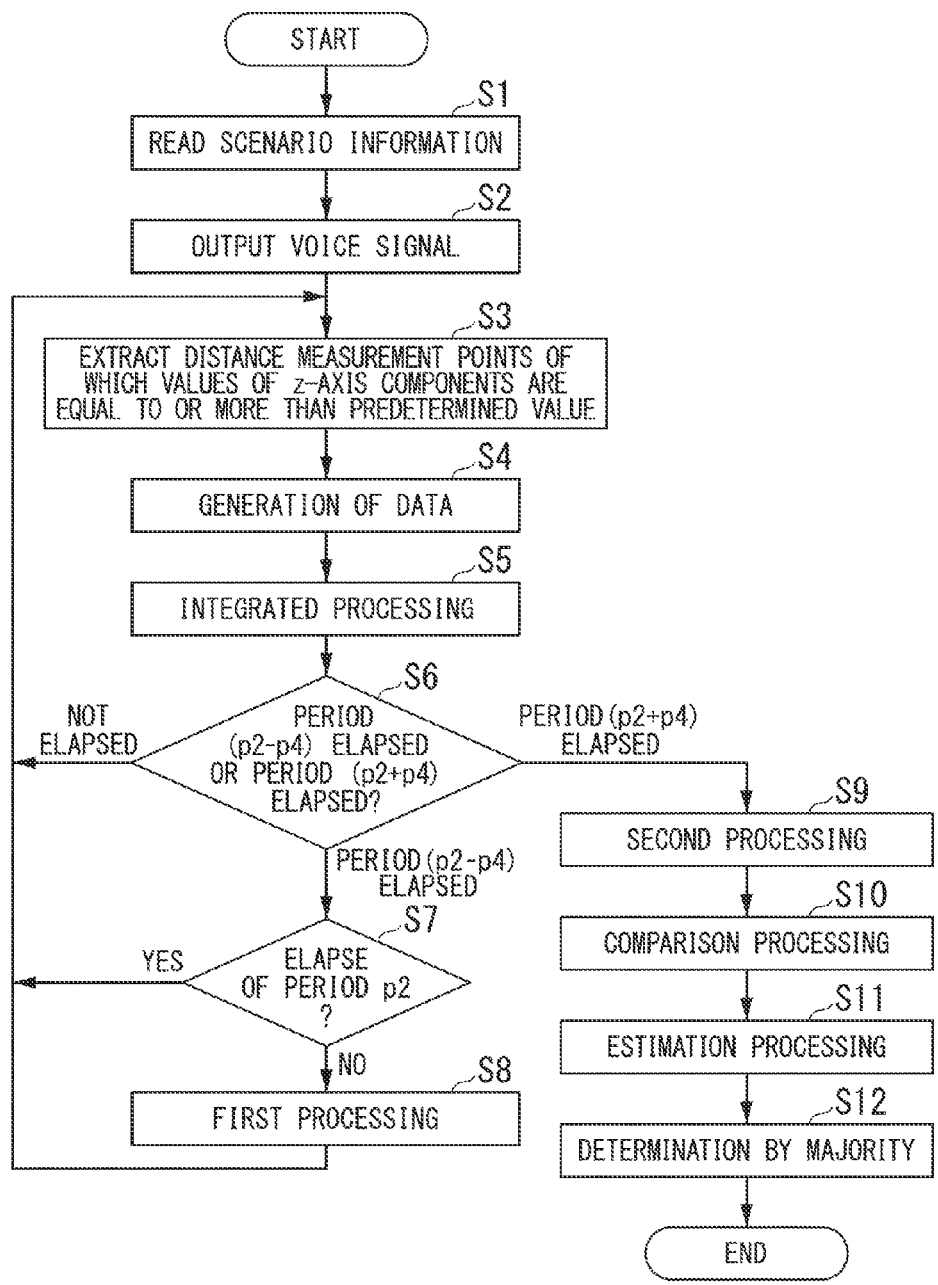
FIG. 3 is a flowchart of a processing procedure of the hand-raising detection by the robot related to the first embodiment.

FIG. 3 is a flowchart of the processing procedure of the hand-raising detection by the robot 1 related to the present embodiment.

(Step S1) The control unit 102 reads the scenario information stored in the storage unit 101. The control unit 102 proceeds to the processing of Step S2.

(Step S2) The control unit 102 causes a voice signal to be output from the voice output unit 103, based on the read scenario information. The control unit 102 proceeds to the processing of Step S3.

(Step S3) The sensing processing units 20 extract distance measurement points of which the values of the z-axis components are equal to or more than a predetermined value, from the detection results input from the LRF sensors 10. The sensing processing units 20 proceed to the processing of Step S4.

(Step S4) The sensing processing units 20 generate person cluster data, using the information on distance measurement points extracted in Step S3. Next, the sensing processing units 20 generate grid data for each grid, using the information on distance measurement points extracted in Step S3. In addition, as for the order in which the data is generated, the grid data may be generated first, or the generation of the person cluster data and the generation of the grid data may be performed in parallel. The sensing processing units 20 proceed to the processing of Step S5.

(Step S5) The object integrated processing unit 30 performs integrated processing, using the person cluster data generated in Step S4.

Next, the grid integrated processing unit 40 performs integrated processing, using the grid data generated in Step S4. In addition, as for the order in which the processing is performed, either the object integrated processing unit 30 or the grid integrated processing unit 40 may be performed first, or both may be performed in parallel. The object integrated processing unit 30 and the grid integrated processing unit 40 proceed to the processing of Step S6.

(Step S6) The situation estimation unit 50 determines whether or not the period (p2−p4) (predetermined period (first period)) has elapsed and whether or not the period (p2+p4) has elapsed. The situation estimation unit 50 returns to Step S3 when it is determined that the period (p2−p4) has not elapsed (Step S6; not elapsed). The situation estimation unit 50 proceeds to Step S7 when it is determined that the period (p2−p4) has elapsed (Step S6; the period (p2−p4) elapsed), and proceeds to Step S9 when it is determined that the period (p2+p4) (predetermined time) has elapsed (Step S6; period (p2+p4) elapsed).

(Step S7) The situation estimation unit 50 determines whether or not the period p2 has elapsed. The situation estimation unit 50 proceeds to Step S8 when it is determined that the period p2 has not elapsed (Step S7; NO), and returns to Step S3 when it is determined that the period p2 has elapsed (Step S7; YES).

(Step S8) The situation estimation unit 50 performs first processing. The situation estimation unit 50 returns to Step S3 after the end of the processing.

(Step S9) The situation estimation unit 50 performs second processing. The situation estimation unit 50 returns to Step S10 after the end of the processing.

(Step S10) The situation estimation unit 50 compares results detected by the first processing of Step S8 with results detected by the second processing of Step S9.

(Step S11) The situation estimation unit 50 estimates the number of persons who have raised their hands, based on the results compared in Step S10. Next, the situation estimation unit 50 estimates the amount of change of the grid height, based on the results compared in Step S10.

The motion estimation device 3 repeats Steps S2 to S11 until predetermined questions are posed a predetermined number of times, based on the scenario information.

(Step S12) The situation estimation unit 50 performs a majority decision, based on the estimated results for each question estimated in Step S11 after predetermined questions are posed a predetermined number of times, based on the scenario information. Specifically, the situation estimation unit 50 selects whether or not the processing results of the object integrated processing unit 30 or the grid integrated processing unit 40 are to be used, according to set conditions. The situation estimation unit 50 compares the number of persons who have raised their hands for each question estimated in Step S11, and selects a question with the greatest number of persons. Otherwise, the situation estimation unit 50 measures the amount of change of the grid height for each question estimated in Step S11, and selects a question with the greatest amount of change.

The processing of the hand-raising detection is ended above.

<Person Cluster Data Generation>

Next, the person cluster data generation performed in Step S4 (FIG. 3) will be described.

Figure 4:
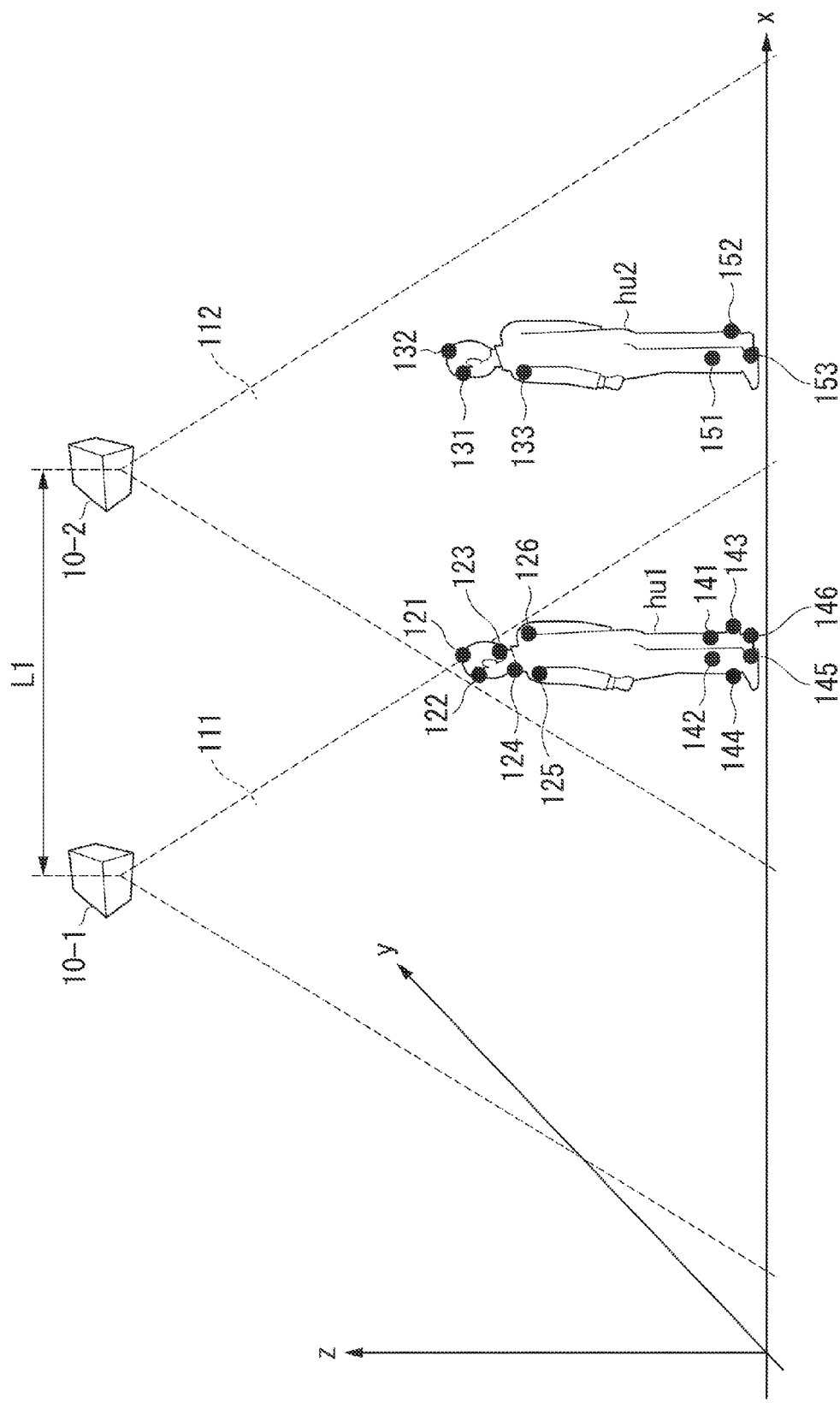
FIG. 4 is a view illustrating measurement performed by LRF sensors and processing performed by sensing processing units and an object integrated processing unit, related to the first embodiment.

FIG. 4 is a view illustrating the measurement performed by the sensing processing units 20 and the processing performed by the LRF sensors 10 and the object integrated processing unit 30, related to the present embodiment. In FIG. 4, a left-right direction toward a sheet plane is defined as an x-axis direction, a depth direction is defined as a y-axis direction, and a height direction is defined as a z-axis direction.

In the example illustrated in FIG. 4, two LRF sensors 10-1 and LRF sensors 10-2 are installed at a distance L1 in the ceiling of a space as a detection target. A region illustrated by reference numeral 111 illustrates a region (hereinafter referred to as a detection region) capable of being detected by the LRF sensor 10-1, and a region illustrated by reference numeral 112 illustrates a detection region of the LRF sensor 10-2. Additionally, in the example illustrated in FIG. 4, distance measurement points of which the height is equal to or more than a predetermined height are illustrated.

Additionally, in the example illustrated in FIG. 4, a person hu1 is present in the detection region 111 of the LRF sensor 10-1, and the person hu1 and the person hu2 are present in the detection region 112 of the LRF sensor 10-2.

Distance measurement points 121 to 126 are distance measurement points with respect to the person hu1, and distance measurement points 131 to 133 are distance measurement points with respect to the person hu2. The distance measurement points are, for example, points corresponding to person's head and ears, the collars and shoulders of clothing, or the like. Respective x, y, and z components are included in the distance measurement points. That is, information indicating positions and information indicating height on an xy plane are included in the distance measurement points.

Also, in the example illustrated in FIG. 4, the distance measurement points 122 to 126 are distance measurement points measured by the LRF sensor 10-1, and the distance measurement points 121 to 126 and 131 to 133 are distance measurement points measured by the LRF sensor 10-2.

Additionally, in FIG. 4, projection points 141 to 146 are points obtained by projecting the distance measurement points 131 to 136 onto the xy plane, and projection points 151 to 153 are points obtained by projecting the distance measurement points 131 to 133 onto the xy plane.

Next, a processing procedure of the clustering processing and the person cluster data generation will be described.

Figure 5:
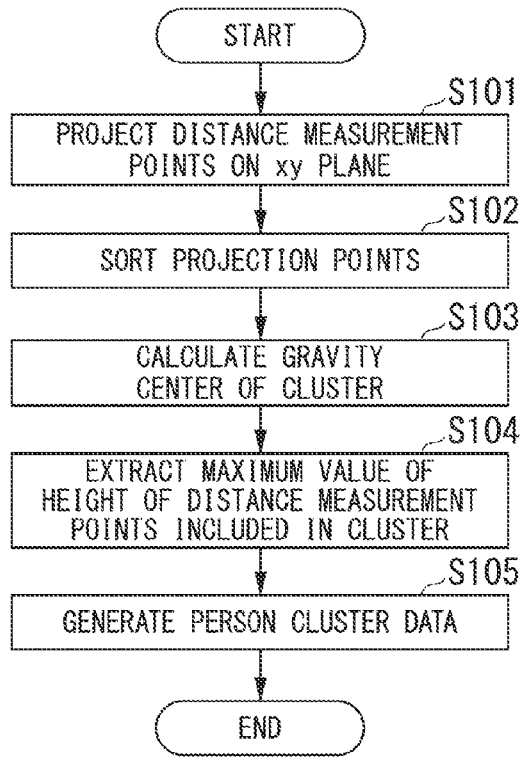
FIG. 5 is a flowchart of a processing procedure of clustering processing and person cluster data generation, related to the first embodiment.

FIG. 5 is a flowchart of the processing procedure of the clustering processing and the person cluster data generation, related to the present embodiment.

(Step S101) The sensing processing units 20 project distance measurement points of which the values of the z-axis components are equal to or more than a predetermined value in the information on distance measurement points, which is input from the corresponding LRF sensors 10, onto the xy plane, using the x-axis components and the y-axis components included in the information on the respective distance measurement points. The sensing processing units 20 proceed to the processing of Step S102.

(Step S102) The sensing processing units 20 sort (cluster) the projection points projected on the xy plane. The sensing processing units 20 proceed to the processing of Step S103.

(Step S103) The sensing processing units 20 calculate the gravity center of the projection points included in the cluster for each clustered cluster, and adopt the calculated gravity center as information indicating the position of the cluster. The sensing processing units 20 proceed to the processing of Step S104.

(Step S104) The sensing processing units 20 extract the maximum value of the z-axis components in the distance measurement points corresponding to the projection points included in the cluster for each clustered cluster, and adopt the extracted maximum value as information indicating the height of the cluster. The sensing processing units 20 proceed to the processing of Step S105.

(Step S105) The sensing processing units 20 associate the information indicating the position of each cluster with the information indicating the height of each cluster to generate the person cluster data of each cluster.

Next, a specific example of the clustering processing and the person cluster data generation will be described, with reference to FIGS. 4 and 5.

The sensing processing unit 20-1 projects the input distance measurement points 122 to 126 onto the xy plane, and generates information on the projection points 142 to 146. The sensing processing unit 20-2 projects the input distance measurement points 121 to 126 and 131 to 133 onto the xy plane, and generates information on the projection points 141 to 146 and 151 to 153 (Step S101).

Next, the sensing processing unit 20-1 sorts the projection points 142 to 146 into one cluster. Additionally, the sensing processing unit 20-2 sorts the projection points 141 to 146 into one cluster, and sorts the projection points 151 to 153 into one cluster (Step S102).

The sensing processing unit 20-1 calculates the gravity center of the clustered projection points 142 to 146. The sensing processing unit 20-1 calculates the gravity center of the clustered projection points 141 to 146 and the gravity center of the clustered projection points 151 to 153 (Step S103).

Next, the sensing processing unit 20-1 extracts the z-axis component of the distance measurement point 122 of which the z-axis component has the maximum value, among the distance measurement points 122 to 126 corresponding to the projection points 142 to 146 included in the sorted cluster. The sensing processing unit 20-2 extracts the z-axis component of the distance measurement point 121 of which the z-axis component has the maximum value among the distance measurement points 121 to 126, and extracts the z-axis component of the distance measurement point 132 of which the z-axis component has the maximum value, among the distance measurement points 131 to 133 (Step S104).

Next, the sensing processing unit 20-1 associates the information indicating a position that is the gravity center of the projection points 142 to 146, with the information indicating the height of the distance measurement point 122, to generate person cluster data $d1_{(11)}$. Next, the sensing processing unit 20-2 associates the information indicating a position that is the gravity center of the projection points 141 to 146 with the information indicating the height of the distance measurement point 121, to generate person cluster data $d1_{(21)}$, and associates the information indicating a position that is the gravity center of the projection points 151 to 153 with the information indicating the height of the distance measurement point 132, to generate person cluster data $d1_{(22)}$ (Step S105).

<First Integrated Processing Performed by Object Integrated Processing Unit 30>

Next, the first integrated processing of Step S5 (FIG. 3) performed by the object integrated processing unit 30 will be described.

Figure 6:
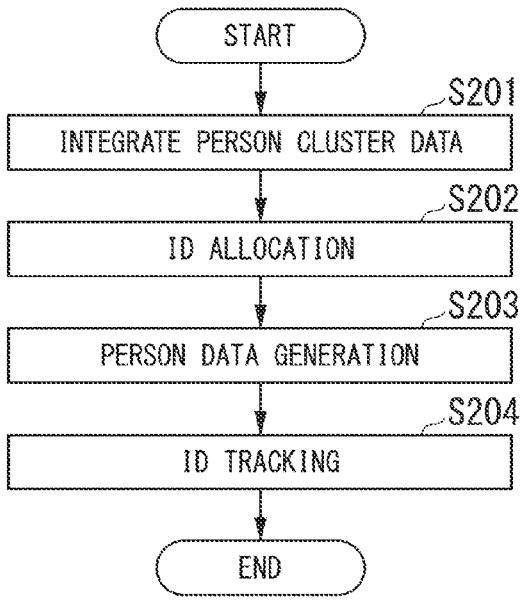
FIG. 6 is a flowchart of an integrated processing procedure performed by the object integrated processing unit, related to the first embodiment.

FIG. 6 is a flowchart of a first integrated processing procedure performed by the object integrated processing unit 30, related to the present embodiment.

(Step S201) The object integrated processing unit 30 integrates the person cluster data input from the sensing processing units 20-1 to 20-$n$. The object integrated processing unit 30 proceeds to the processing of Step S202.

(Step S202) The object integrated processing unit 30 allocates an ID to each cluster, using the integrated person cluster data. The object integrated processing unit 30 proceeds to the processing of Step S203.

(Step S203) The object integrated processing unit 30 associates the information indicating the position of a cluster where an ID is allocated, the information indicating the height of the cluster to which the ID is allocated, and the allocated. ID for each ID, to generate the person data. The object integrated processing unit 30 proceeds to the processing of Step S204.

(Step S204) The object integrated processing unit 30 performs tracking with respect to the position and height of a person to whom the ID is allocated for each ID, using the generated person data. In addition, the object integrated processing unit 30 deletes the person data corresponding to the ID that cannot be tracked when the tracking cannot be performed.

Next, a specific example of the first integrated processing performed by the object integrated processing unit 30 will be described with reference to FIGS. 4 and 6.

The object integrated processing unit 30 determines the information indicating position of the person cluster data $d1_{(11)}$ input from the sensing processing units 20-1 and the information indicating position of the person cluster data $d1_{(21)}$ input from the sensing processing unit 20-2 are within a predetermined range, and integrates these cluster data $d1_{(11)}$ and $d1_{(21)}$ (Step S201). Next, the object integrated processing unit 30 allocates, for example, an ID1 to the cluster data in which the person cluster data $d1_{(11)}$ and $d1_{(21)}$ are integrated (Step S202). Additionally, the object integrated processing unit 30 extracts the value of the z-axis component of the distance measurement point 121 as the maximum value from the information indicating height included in the person cluster data $d1_{(11)}$ and $d1_{(21)}$.

Additionally, the object integrated processing unit 30 determines that there is no other person cluster data of which information indicating position is within a predetermined range from that of the person cluster data $d1_{(22)}$ input from the sensing processing unit 20-2. In this case, the object integrated processing unit 30 does not integrate the other person cluster data into the person cluster data $d1_{(22)}$ (Step S201). Next, the object integrated processing unit 30 allocates an ID2 to the person cluster data $d1_{(22)}$ (Step S202). Additionally, the object integrated processing unit 30 extracts the information indicating height included in the person cluster data $d1_{(22)}$.

Next, the object integrated processing unit 30 generates the person data of the ID1 and the person data of the ID2 (Step S203).

Next, the object integrated processing unit 30 tracks the respective IDs. In the tracking, for example, when the person cluster data after integration included in the respective IDs that are allocated at the time t1 (FIG. 2) is not within a predetermined range at every sampling time Δt, it is determined that the respective IDs are the same. The predetermined range is, for example, a range where the person cluster data is movable when a person has walked and moved at the sampling time Δt. Moreover, the object integrated processing unit 30 tracks the information indicating height included in the person data determined to have the same ID (Step S204).

Figure 7:
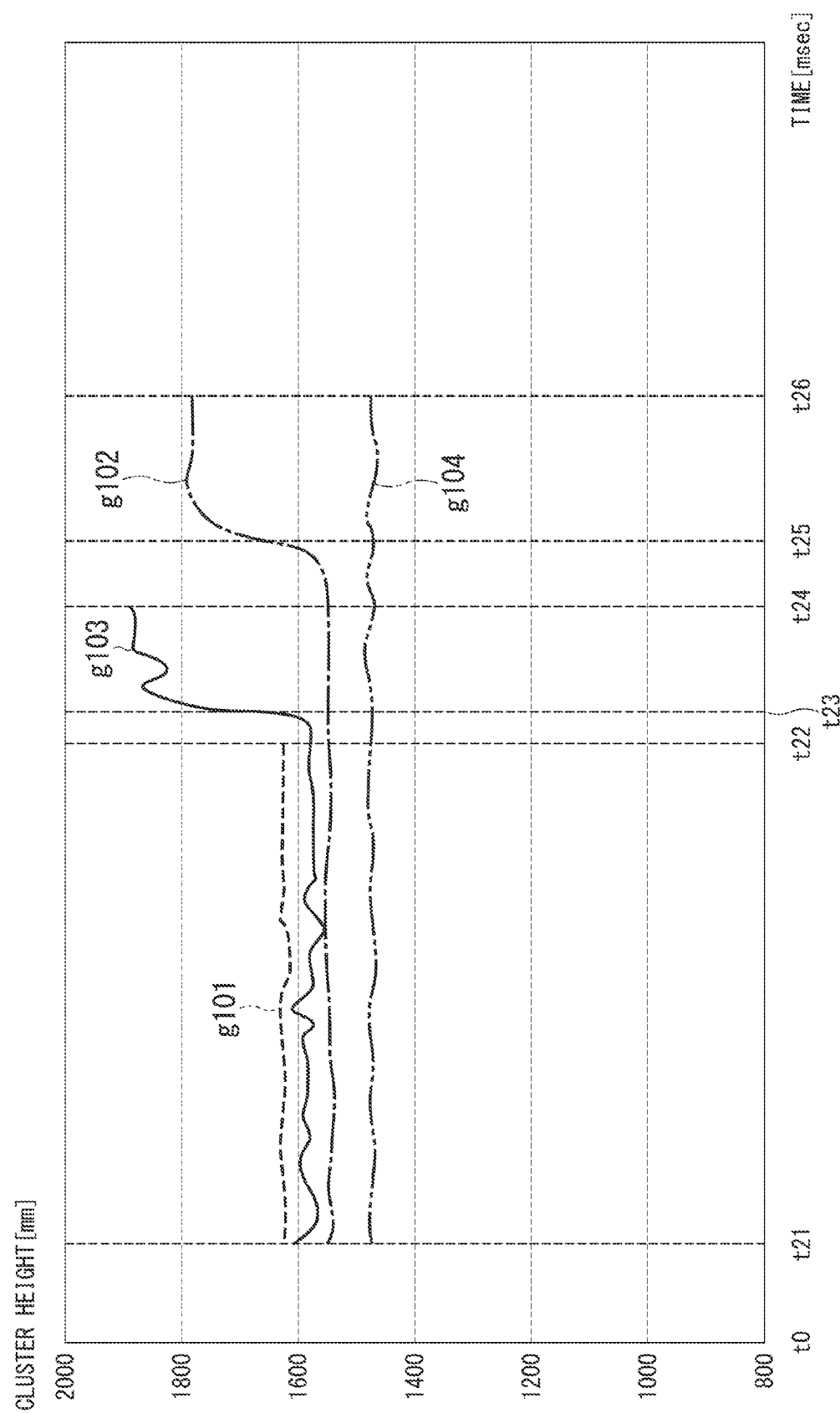
FIG. 7 is a view illustrating an example of results obtained when tracking is performed, related to the first embodiment.

FIG. 7 is a view illustrating an example of results obtained when tracking is performed, related to the present embodiment. In addition, the example illustrated in FIG. 7 is an example in which four persons of ID4 to ID7 are detected. Additionally, the cluster height illustrated in FIG. 7 is the value of the z-axis component of the highest distance measurement point for each ID extracted by the object integrated processing unit 30.

In FIG. 7, the horizontal axis represents time and the vertical axis represents the cluster height. Additionally, a curve of reference numeral g101 is a curve showing the time change of the cluster height of a person to whom ID4 is allocated by the object integrated processing unit 30, a curve of reference numeral g102 is a curve showing the time change of the cluster height of a person to whom ID5 is allocated, a curve of reference numeral g103 is a curve showing the time change of the cluster height of a person to whom ID6 is allocated, and a curve of reference numeral g104 is a curve showing the time change of the cluster height of a person to whom ID7 is allocated.

A time t21 is a time at which the control unit 102 starts to output a voice signal "People who want to hear A, please raise your hands" from the voice output unit 103, based on the scenario information stored in the storage unit 101.

The respective curves g101 to g104 illustrate changes in the cluster heights to which ID4 to ID7 are allocated. As illustrated by the curve g101, the cluster height of ID4 is about 1620 [mm], and the tracking fails at a time t22. In addition, the failure of the tracking occurs, for example, when the person cluster data that is being tracked has disappeared. The disappearance of the person cluster data occurs, for example, when a person moves out of a detection region (predetermined range).

As illustrated by curve g102, the cluster height of ID5 is about 1550 [mm] during a period of times t21 to t25, and the cluster height changes to about 1800 [mm] at a time t25.

Additionally, as illustrated by the curve g103, the cluster height of ID6 is about 1580 [mm] during a period of times t21 to t23, the cluster height changes to about 1900 [mm] at a time t23, and the tracking fails at a time t24. As illustrated by the curve g104, the cluster height of ID7 does not change at about 1480 [mm] during a period of times t21 to t26.

<Grid Data Generation>

Next, the grid data generation performed in Step S4 (FIG. 3) will be described.

Figure 8:
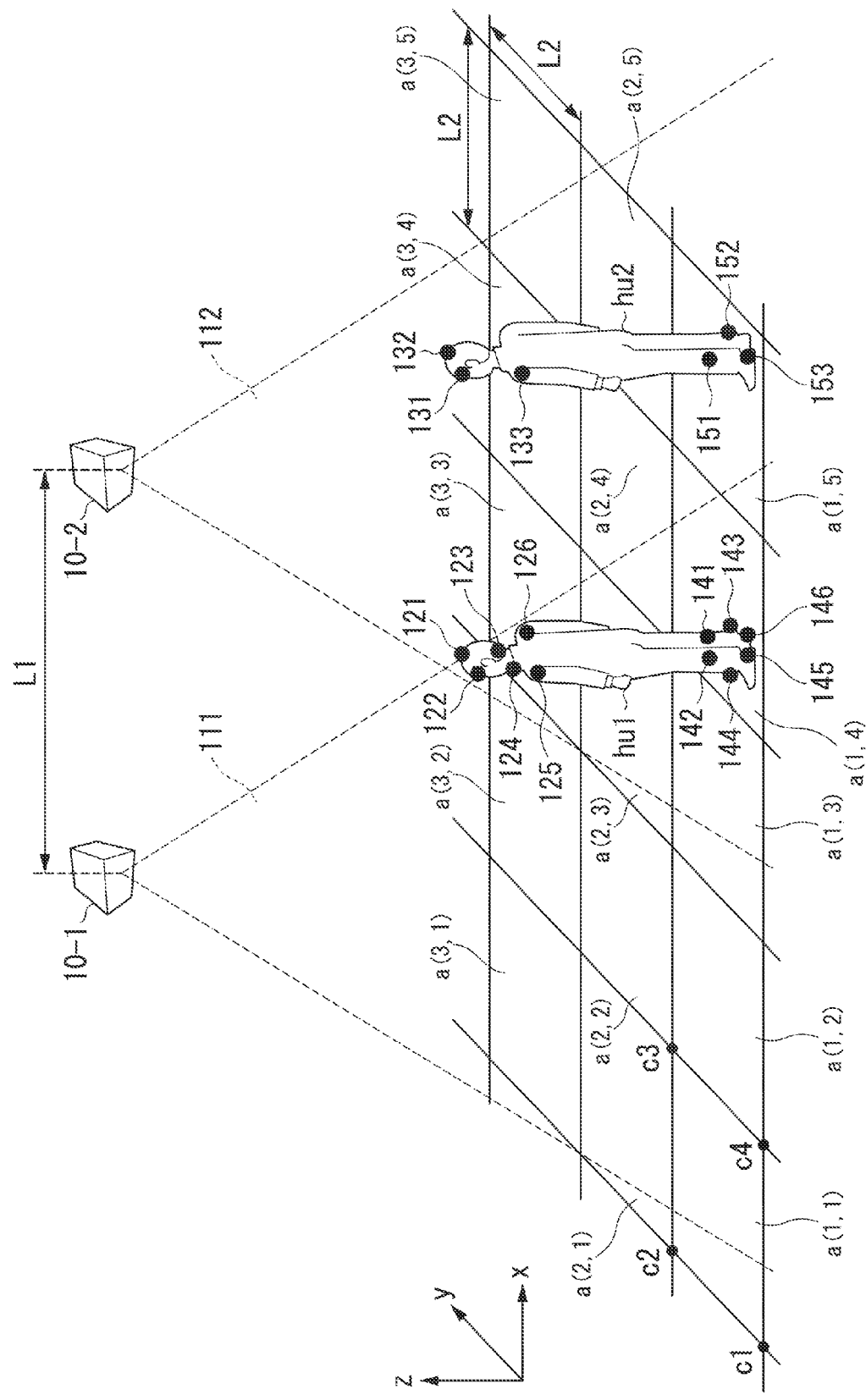
FIG. 8 is a view illustrating the measurement performed by the LRF sensors and processing performed by the sensing processing units and a grid integrated processing unit, related to the first embodiment.

FIG. 8 is a view illustrating the processing performed by the sensing processing units 20 and the measurement performed by the LRF sensors 10 and the grid integrated processing unit 40, related to the present embodiment. In FIG. 8, similar to FIG. 4, a left-right direction toward a sheet plane is defined as an x-axis direction, a depth direction is defined as a y-axis direction, and a height direction is defined as a z-axis direction. Additionally, grids a(1, 1) to a(3, 5) are set in advance in a space as a detection target. The grids have length L2 and width L2, and L2 is 10 cm. In addition, the same elements as those of FIG. 4 will be designated by the same reference numerals, and the description thereof will be omitted. Additionally, in the example illustrated in FIG. 8, similar to FIG. 4, distance measurement points of which the height is equal to or more than a predetermined height are illustrated.

The coordinate values of respective apexes of the grids a(1, 1) to a(3, 5) are stored in advance in the sensing processing units 20. For example, as for the respective xy coordinate values of the grid a(1, 1), a lower left apex c1 is (0, 0), an upper left apex c2 is (10, 0), an upper right apex c3 is (10, 10), and a lower right apex c4 is (0, 10). The sensing processing units 20 sort the projection points in this range as projection points of the grid a(1, 1).

Figure 9:
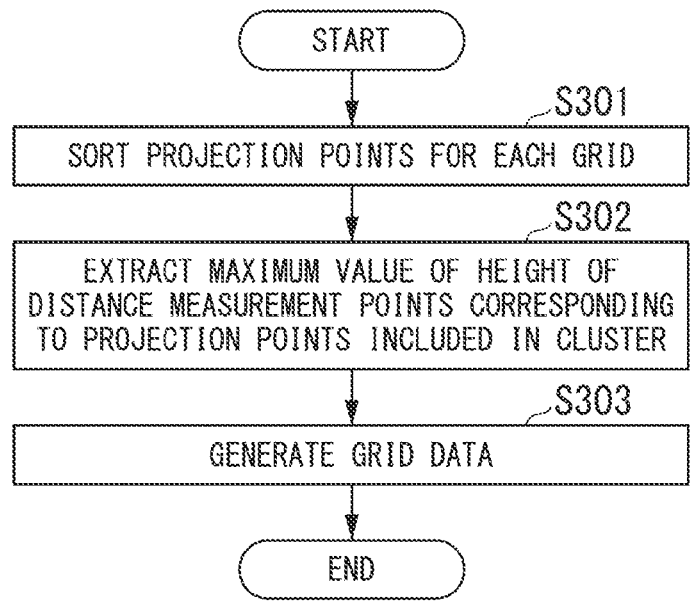
FIG. 9 is a flowchart of a processing procedure of grid data generation, related to the first embodiment.

FIG. 9 is a flowchart of the processing procedure of the grid data generation, related to the present embodiment.

(Step S301) The sensing processing units 20 sort the projected projection points for each grid after Step S101 (FIG. 5). The sensing processing units 20 proceed to the processing of Step S302.

(Step S302) The sensing processing units 20 extract the maximum value of the z-axis components in the distance measurement points corresponding to the projection points included in each grid, and adopt the extracted z-axis components as information indicating the height of the grid. The sensing processing units 20 proceed to the processing of Step S303.

(Step S303) The sensing processing units 20 associate the information indicating the position of each grid, and the information indicating the height of the extracted grid, to generate grid data.

In the example illustrated in FIG. 8, the sensing processing unit 20-1 sorts the projection points 142 to 146 into a grid a(1, 4), and extracts the z-axis component of the distance measurement point 122 corresponding to the projection point 142 as information indicating height. Then, the sensing processing unit 20-1 associates the information indicating the position of the grid a(1, 4) with the information indicating height that is the z-axis component of the distance measurement point 122, to generate grid data $d2_{(11)}$.

Additionally, the sensing processing unit 20-2 sorts the projection points 141 to 146 into the grid a(1, 4), and extracts the z-axis component of the distance measurement point 121 corresponding to the projection point 141 as information indicating height. Moreover, the sensing processing unit 20-2 sorts the projection points 151 to 153 into a grid(1, 5), and extracts the z-axis component of the distance measurement point 132 corresponding to the projection point 152 as information indicating height. Then, the sensing processing unit 20-2 associates the information indicating the height of the grid a(1, 4) with the information indicating height that is the z-axis component of the distance measurement point 121, to generate grid data $d2_{(21)}$, and associates the information indicating the position of the grid a(1, 5) with the information indicating height that is the z-axis component of the distance measurement point 132, to generate grid data $d2_{(22)}$.

In addition, the sensing processing units 20 create grid data of only the grids from which the information indicating height is extracted.

<Integrated Processing Performed by Grid Integrated Processing Unit 40>

Next, the integrated processing performed in Step S5 (FIG. 3) will be described.

Figure 10:
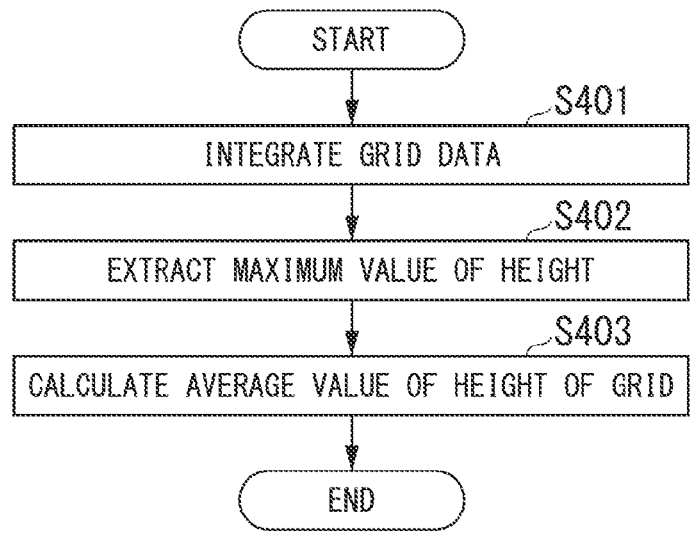
FIG. 10 is a flowchart of an integrated processing procedure performed by the grid integrated processing unit, related to the first embodiment.

FIG. 10 is a flowchart of an integrated processing procedure performed by the grid integrated processing unit 40, related to the present embodiment.

(Step S401) The grid integrated processing unit 40 integrates the grid data d2 in which information items indicating positions included in the grid data d2 coincide with each other and which is input from the sensing processing units 20-1 to 20-n. The grid integrated processing unit 40 proceeds to the processing of Step S402.

(Step S402) The grid integrated processing unit 40 extracts the maximum value when there are a plurality of items of information indicating the height of a grid after the integration, and determines the extracted information indicating height as the height value of the grid. The grid integrated processing unit 40 proceeds to the processing of Step S403.

(Step S403) The grid integrated processing unit 40 counts the number of grids after the integration that have the information indicating height, and adopts this number as the number of grids. Next, the grid integrated processing unit 40 adds up the height values of all the grids having the information indicating height, and divides the added-up height value by the number of grids, thereby calculating the average value of the height of the grids.

For example, the grid integrated processing unit 40 calculates the average value Zave of values in the z-axis direction, which is the height of the grids having the information indicating height, using the following Formula (1).

$$\text{Average Value Zave} = \Sigma(\text{Height of Respective Grids in Z-axis Direction})/(\text{Number of Grids to which Information indicating Height Is Added}) \quad (1)$$

In the example illustrated in FIG. 8, the average value Zave is {Height (Component of Distance Measurement Point 132) in Z-Axis Direction} of Grid a(1, 4)+Height (Component of Distance Measurement Point 121 in Z-Axis Direction) of Grid a(1, 5)}/2.

Next, the grid integrated processing unit 40 calculates the average value Zave of the height of the grids having the information indicating height at the time t5 (FIG. 2), using Formula (1).

For example, it is supposed that the height of the person hu1 illustrated in FIG. 8 is 173 [cm], the height of the person hu2 is 168 [cm], and the height when the person hu1 has raised their hand is 210 [cm], and the height when the person hu2 has raised their hand is 195 [cm].

When both the person hu1 and the person hu2 raise their hands during the period p4 (FIG. 2), the average value Zave of the height of the grids in the period p4 during which the persons raise their hands is 202.5 [cm] (=(210 [cm]+195 [cm])/2). In this case, it is supposed the maximum value Zmax in the period p4 is the average value Zave. Additionally, the average value Zave of the height of the grids at the time t5 at which the persons lower their hands is 170.5 [cm] (=(173 [cm]+168 [cm])/2). A difference is 32 [cm] if the maximum value Zmax 202.5 [cm] during the period p4 is compared with the average value Zave 170.5 [cm] at the time t5.

Additionally, in FIG. 8, when only the person hu1 raises their hand during the period p4, the average value Zave of the height of the grids in the period p4 during which the person raises their hand is 189 [cm] (=(210 [cm] 168 [cm])/2). Similarly, it is supposed the maximum value Zmax in the period p4 is the average value Zave. Additionally, the average value Zave of the height of the grids at the time t5 at which the person lowers their hand is 170.5 [cm] (=(173 [cm]+168 [cm])/2). A difference is 18.5 [cm] if the maximum value Zmax 189 [cm] during the period p4 is compared with the average value Zave 170.5 [cm] at the time t5.

That is, the number of persons who have raised their hands increases as the difference between the maximum value Zmax during the period p4 and the average value Zave at the time t5 becomes larger.

For example, the robot 1 repeats the processing illustrated in FIG. 3 three times according to the scenario information, thereby causing persons who are present in a detection region to select one of three options.

The situation estimation unit 50 causes the voice signal "People who want to hear A, please raise your hands" to be output from the voice output unit 103 at a time $t1_{(1)}$ at the first-time. Then, a difference $\Delta g1$ between the maximum value during a period $p4_{(1)}$ at the first-time and the average value at a time $t5_{(1)}$ at the first-time is calculated.

Next, the situation estimation unit 50 causes the voice signal "People who want to hear B, please raise your hands" to be output from the voice output unit 103 at a time $t1_{(2)}$ at the second-time (=time t11, FIG. 2). Then, a difference $\Delta g2$ between the maximum value during a period $p4_{(2)}$ at the second-time and the average value at a time $t5_{(2)}$ at the second-time (=time t15, FIG. 2) is calculated.

Next, the situation estimation unit 50 causes a voice signal "People who want to hear C, please raise your hands" to be output from the voice output unit 103 at a time $t1_{(3)}$ at the third-time. Then, a difference $\Delta g3$ between the maximum value during a period $p4_{(3)}$ at the third-time and the average value at a time $t5_{(3)}$ at the third-time is calculated.

The situation estimation unit 50 compares the differences $\Delta g1$ to $\Delta g3$ calculated in this way, thereby estimating that there is the greatest number of hands raised regarding any question among the questions A to C.

As described above, in the motion estimation device 3 of the present embodiment, a person's reaction is whether or not a person raises his/her hand, and the situation estimation unit (for example, the situation estimation unit 50) estimates persons' reactions at multiple times and performs a majority decision based on the results estimated at the multiple times.

By virtue of this configuration, the motion estimation device 3 can perform a majority decision.

In addition, although an example in which the sensing processing units 20 generate grid data only for grids from which height information can be extracted has been described in the above-described example, the invention is not limited to this. The sensing processing units 20 may associate grids having no information indicating height with, for example, 0 as information indicating height, to generate grid data. In this case, in Step S403, the grid integrated processing unit 40 may adopt the number of grids, having greater values than 0 as height information, as the number of grids, and may adopt the values greater than 0 as information indicating height as the height values of grids.

In the example illustrated in FIG. 8, the grid integrated processing unit 40 integrates the grid data $d2_{(11)}$ input from the sensing processing unit 20-1 and the grid data $d2_{(21)}$ input from the sensing processing unit 20-2 as grid data of one grid because information items indicating positions included in these data, respectively, coincide with each other. When information items indicating height input from the plurality of the sensing processing units 20 do not coincide with each other, the grid integrated processing unit 40 compares the z-axis components of the information items indicating height input from the plurality of the sensing processing units 20 with each other, and extracts the larger z-axis component as the maximum value.

Additionally, the grid integrated processing unit 40 does not perform integration with other grid data because there is no other grid data that coincides with the information indicating positions included in the grid data $d2_{(22)}$ input from the sensing processing unit 20-2. Then, the grid integrated processing unit 40 extracts the z-axis component of the distance measurement point 132 that is information indicating height, as the maximum value.

Then, the grid integrated processing unit 40 divides the addition value of the z-axis components of the distance measurement points 121 and 132 by 2 that is the number of grids, thereby calculating the grid height.

<Timing at which First Processing and Second Processing are Performed>

Next, timings at which the first processing and the second processing are performed will be described.

Figure 11:
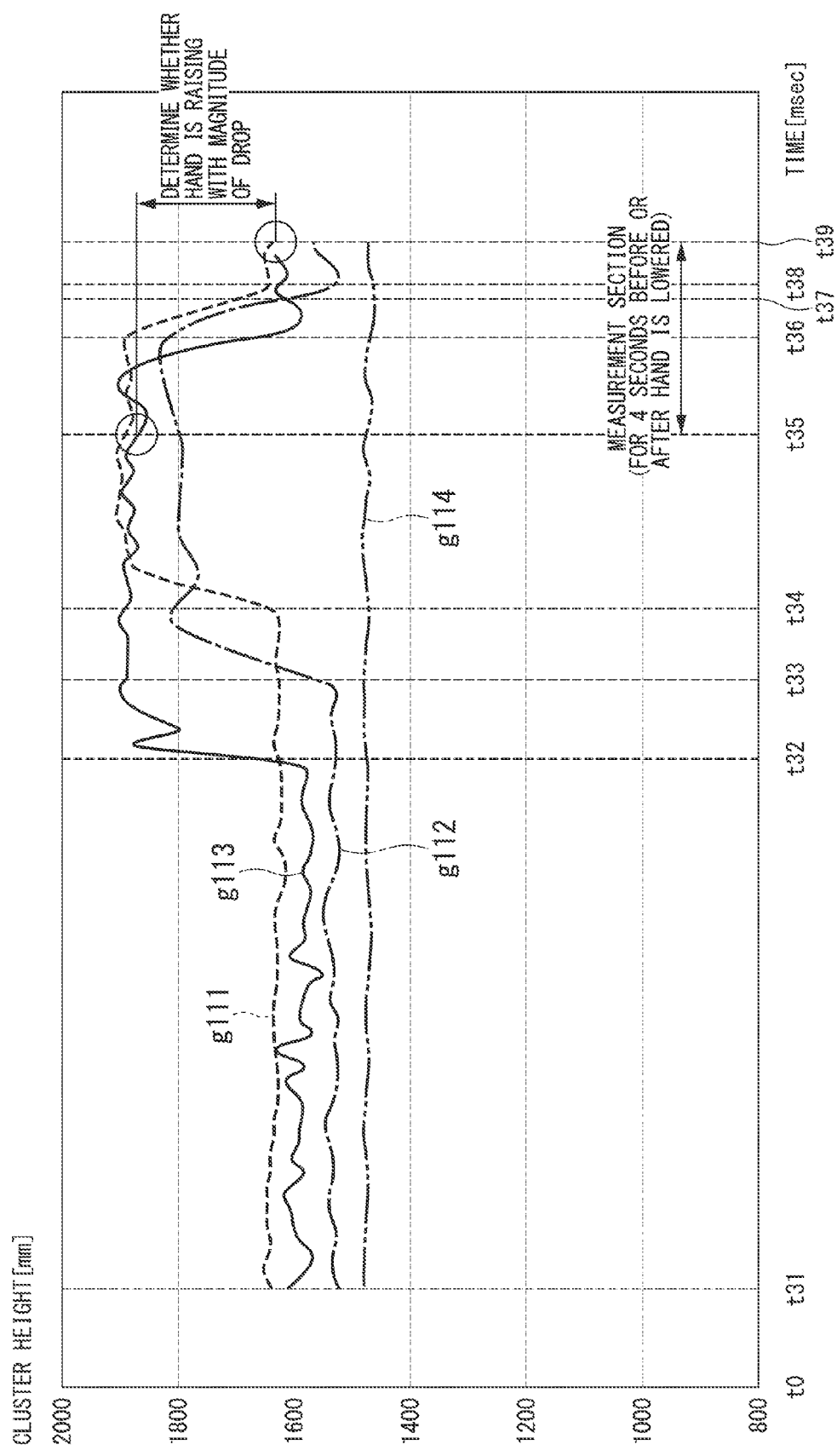
FIG. 11 is a view illustrating timings at which first processing and second processing are performed, related to the first embodiment.

FIG. 11 is a view illustrating timings at which the first processing and the second processing are performed, related to the present embodiment.

In FIG. 11, similar to FIG. 7, the horizontal axis represents time and the vertical axis represents the cluster height. Additionally, respective curves g111 to g114 illustrate the time changes of the cluster height of persons to whom ID4 to ID7 are allocated by the object integrated processing unit 30. The results obtained when four persons to whom ID4 to ID7 are allocated can be tracked are illustrated in the example illustrated in FIG. 11. In addition, the situation estimation unit 102 starts to output the same voice signal "People who want to hear A, please raise your hands" as the voice signal at the time t1 (FIG. 2), at a time t31, and starts to output the same voice signal "Yes, I see" as the voice signal at the time t4 (FIG. 2), at a time t35.

At a time t32, the cluster height of the person to whom ID6 is allocated increases as illustrated by the curve g113, at a time t33, the cluster height of the person to whom ID5 is allocated increases as illustrated by the curve g112, and at a time t34, the cluster height of the person to whom ID4 is allocated increases as illustrated by the curve g111. As illustrated by the curve g114, the cluster height of the person to whom ID7 is allocated changes less than a predetermined threshold value.

At a time t36, the cluster height of the person to whom ID6 is allocated decreases as in reference numeral g113, at a time t37, the cluster height of the person to whom ID4 is allocated decreases as in reference numeral g111, and at a time t38, the cluster height of the person to whom ID5 is allocated decreases as in reference numeral g112.

As illustrated in FIG. 11, when a plurality of persons are present in a detection region and some of them raise their hands, there is a high variation in the timings at which some persons raise their hands. For example, a person may raise their hand after confirming that surrounding persons have raised their hands. For example, the time difference between the time t32 and the time t34 that is illustrated in FIG. 11 is, for example, 3 seconds. Moreover, it is unclear when a plurality of persons begin to raise their hands. If an attempt to detect that the persons have raised their hands is made in this way, in FIG. 11, it is necessary to perform detection during the time t31 to the time 35.

Meanwhile, the time difference between the time t36 and the time 38 that is illustrated in FIG. 11 is, for example, 1 second. That is, as illustrated in FIG. 11, if a predetermined amount of time elapses from the time t35 when the voice signal "Yes, I see" is output, persons who have raised their hands lower their hands within a short amount of time.

For this reason, in the present embodiment, a signal when the voice signal "Yes, I see" is output at the time t35 is adopted as a trigger signal, and the first processing is performed in a period during which it is estimated that persons raise their hands and which is before a predetermined time from a time at which the trigger signal is input. Also, in the present embodiment, the number of persons who have raised their hands is detected by performing the second processing after a predetermined time from the time at which the trigger signal is input and by comparing the results of the first processing and the second processing. The predetermined time is, for example, 2 seconds.

(First Processing)

Next, the first processing performed in Step S8 (FIG. 3) will be described.

First, the first processing that the situation estimation unit 50 performs using the person data d3 will be described with reference to FIG. 2.

The situation estimation unit 50 detects the maximum value from the information indicating height included in the person data d3 for each ID from the time after the elapse of a period (p2−p4) to the time after the elapse of the period p2, that is, during t3 to t4. The detection of the maximum value is performed, for example, by comparing the information indicating height at a time t−Δt (sampling time) and a time t, for example, and holding a greater value as the maximum value.

The situation estimation unit 50 causes the maximum value detected during the times t3 to t4 to be stored in the storage unit 60 as the first cluster height value of an ID having the maximum value.

Next, the first processing that the situation estimation unit 50 performs using the information d4 indicating grid height will be described with reference to FIG. 2.

The situation estimation unit 50 detects the maximum value from the information d4 indicating grid height during the times t3 to t4. The situation estimation unit 50 causes the maximum value detected during the times t3 to t4 to be stored in the storage unit 60 as the first grid height value.

<Second Processing>

Next, the second processing performed in Step S9 (FIG. 3) will be described.

First, the second processing that the situation estimation unit 50 performs using the person data d3 will be described with reference to FIG. 2.

The situation estimation unit 50 detects the information indicating height included in the person data for each ID after the elapse of the period (p2+p4), that is, at the time t5. The situation estimation unit 50 causes the value extracted at the time t5 to be stored as the second cluster height value of an ID having this extracted value in the storage unit 60.

Next, the second processing that the situation estimation unit 50 performs using the information d4 indicating grid height will be described with reference to FIG. 2.

The situation estimation unit 50 causes the information d4 indicating grid height at the time t5 to be stored as the second grid height value in the storage unit 60.

<Comparison Processing>

Next, the comparison processing and the estimation processing that are performed in Steps S10 and S11 will be described (FIG. 3).

First, the comparison processing and the estimation processing that the situation estimation unit 50 performs with respect to the person data d3 will be described.

The situation estimation unit 50 reads the first cluster height value and the second cluster height value stored in the storage unit 60 for each ID, and compares the read first cluster height value with the read second cluster height value, thereby determining whether or not a hand is raised for each ID.

The situation estimation unit 50 determines that a hand is raised, for example, when a value obtained by subtracting the second cluster height value from the first cluster height value is equal to or more than a predetermined value. Otherwise, the situation estimation unit 50 determines that a hand is raised, for example, when the value obtained by dividing the first cluster height value by the second cluster height value is equal to or more than a predetermined value.

Next, the comparison processing and the estimation processing that the situation estimation unit 50 performs with respect to the information d4 indicating grid height will be described.

The situation estimation unit 50 reads the first grid height value and the second grid height value stored in the storage unit 60, and compares the read first grid height value with the read second grid height value, thereby comparing the amount of change of the grid height.

The situation estimation unit 50, for example, may adopt a value obtained by subtracting the second grid height value from the first grid height value as a grid height change amount, or may adopt a value obtained by dividing the first grid height value by the second grid height value as the grid height change amount.

Next, an example in which the situation estimation unit 50 uses either the detection results detected by the above-described object integrated processing unit 30 or the detection results detected by the grid integrated processing unit 40 will be described.

The situation estimation unit 50 selects either the detection results detected by the above-described object integrated processing unit 30 or the detection results detected by the grid integrated processing unit 40, according to the following conditions.

(Condition 1) Selection Based on Tracking Results Input from Object Integrated Processing Unit 30

When the number of times by which tracking has failed or a rate at which the tracking has failed is less than a predetermined value, the detection results detected by the object integrated processing unit 30 are selected, and when the number of times at which the tracking has failed or the rate at which the tracking has failed is equal to or more than the predetermined value, the detection results detected by the grid integrated processing unit 40 are selected.

(Condition 2) Selection Based on Density of Persons

When the density of each grid is detected, and when the detected density of each grid is less than a predetermined value, the detection results detected by the object integrated processing unit 30 are selected, and when the detected density of each grid is equal to or more than the predetermined value, the detection results detected by the grid integrated processing unit 40 are selected. In addition, the density in the present embodiment is, for example, an index based on the number of persons who are within a predetermined area.

As described above, the motion estimation device 3 of the present embodiment includes the acquisition units (for example, the sensing processing units 20) that acquire distances (for example, the values of persons in the height direction) between sensors (for example, the LRF sensors 10) and objects (for example, persons), and the situation estimation unit (for example, the situation estimation unit 50) that estimates the person's reactions based on distances acquired by the acquisition units at a first time (for example, the time t3 or the time t5) that is set based on a time when the persons are urged to stop raising their hand (for example, the time t4).

By virtue of this configuration, in the motion estimation device 3 of the present embodiment, based on the distance measurement points measured by the LRF sensors 10 at a timing at which persons have lowered their hands, the number of the persons who have lowered their hands, which is the person's reactions, is estimated as the number of persons who have raised their hands, or the amount of change of height, which is the percentage of the persons who have lowered their hands (=the percentage of the persons who have raised their hands), is estimated. Accordingly, the motion estimation device 3 of the present embodiment can precisely estimate the person's reactions in a short amount of period of time compared to a period during which hands are raised.

Additionally, in the motion estimation device 3 of the present embodiment, the situation estimation unit (for example, the situation estimation unit 50) estimates the person's reactions, based on the distances (for example, the values of persons in the height direction) acquired by the acquisition units in the first period (for example, the period p4 from the time t3 to the time t4 or the period p6 from the time t4 to the time t5) that is set based on a time when the persons are urged to stop raising their hand.

Additionally, in the motion estimation device 3 of the present embodiment, the situation estimation unit (for example, the situation estimation unit 50) extracts distances of objects (for example, persons) in a height direction at the first time (for example, the time t3) and in the first period (for example, the period p4 from the time t3 to the time t4), and compares the extracted distances in the height direction at the first time and in the first period with each other, thereby estimating a person's reaction.

Additionally, the motion estimation device 3 of the present embodiment includes the identifier applying unit (for example, the object integrated processing unit 30) that detects persons based on the distances (for example, the values of persons in the height direction) acquired by the acquisition units (for example, the sensing processing units 20) and applies identifiers (for example, IDs) to the detected persons. The situation estimation unit (for example, the situation estimation unit 50) extracts the distances of each identifier in the height direction at the first time (for example, the time t3) and in the first period (for example, the period p4 from the time t3 to the time t4) by using the distances of the persons to which the identifiers are applied by the identifier applying unit, and compares the extracted distances of each identifier in the height direction at the first time and in the first period with each other, thereby estimating persons' reactions.

By virtue of this configuration, the motion estimation device 3 of the present embodiment can detect the number of persons who have raised their hands, based on the values in the height direction when the persons raise their hands in a period before the persons lower their hands, and the values in the height direction when the persons lower their hands.

Additionally, the motion estimation device 3 of the present embodiment includes the region distance processing unit (for example, the grid integrated processing unit 40) that divides a predetermined range, in which a person's reaction is to be estimated, into one or more regions and obtains the distances (for example, the values of persons in the height direction) of the divided regions based on the distances acquired by the acquisition units (for example, the sensing processing units 20). The situation estimation unit (for example, the situation estimation unit 50) estimates persons' reactions according to at least one distance among the distance of the person to which an identifier (for example, ID) is applied by the identifier applying unit (for example, the object integrated processing unit 30) and the distance obtained by the region distance processing unit.

By virtue of this configuration, in the motion estimation device 3 of the present embodiment, the period during which hands are raised, and the amount of change in the height direction in a region when hands have been lowered can be estimated. Also, in the motion estimation device 3, which question has the greatest number of hands raised by a majority vote can be estimated based on the estimated results.

In addition, although an example in which the situation estimation unit 50 of the motion estimation device 3 selects either the processing results of the object integrated processing unit 30 or the processing results of the grid integrated processing unit 40 and the selected results are output to the processing unit 2 has been described in the present embodiment, the invention is not limited to this. The situation estimation unit 50 may output both the processing results of the object integrated processing unit 30 and the processing results of the grid integrated processing unit 40 to the processing unit 2, and the processing unit 2 may select which processing results are to be used.

Additionally, although an example in which the trigger signal d5 is generated based on a timing based on lowering hands has been described in the present embodiment, the invention is not limited to this. The motion estimation device 3 may calculate a time until a voice signal that lowers hands is output, based on, for example, a timing at which persons are urged to raise their hands, and calculate the period p4 that is a period during which hands are lowered or the time t5 that is a time when hands are lowered, based on the calculated time, the control unit 102 may output the trigger signal d5 to the motion estimation device 3 at this timing.

Additionally, although an example in which the first processing and the second processing (FIG. 3) are performed based on the scenario information and the timing at which persons are urged to lower their hands has been described in the present embodiment, the invention is not limited to this.

The situation estimation unit 50 may acquire the average value of height at every sampling time in a grid from which the information indicating height calculated by the grid integrated processing unit 40 is extracted. Also, the situation estimation unit 50 may determine whether or not the average value of height in the grid from which the acquired information indicating height is extracted becomes smaller than a predetermined value, and may determine that the hands of persons who are present in a detection region have been lowered when the average value has become smaller than the predetermined value. Also, the situation estimation unit 50 may determine a period during which hands are raised or a time at which hands are lowered, based on when the hands of persons who are present in a detection region have been lowered.

In this case, the motion estimation device 3 may associate the results processed by the object integrated processing unit 30 and the results processed by the grid integrated processing unit 40, with the information indicating time, respectively, cause the associated results to be stored in the storage unit 60, and read information on determined periods and times from the storage unit 60 to perform the first processing and the second processing.

As described above, in the motion estimation device 3 of the present embodiment, the first time (for example, the time t3 or the time t5) or the first period (for example, the period p4 from the time t3 to the time t4) is determined to correspond to a time when the change of the distance (for example, the value in the height direction) measured by the region distance processing unit (for example, the grid integrated processing unit 40) becomes smaller than a predetermined value.

By virtue of this configuration, in the motion estimation device 3 of the present embodiment, the period during which hands are raised and the period during which hands are lowered can be determined based on the results obtained by the distance measurement points measured by the LRF sensors 10 being processed by the grid integrated processing unit 40, irrespective of the scenario information. As a result, in the present embodiment, even if the trigger signal d5 is not used, the number of persons who have raised their hands or the amount of change of the height of person's hands can be estimated.

[Second Embodiment]

Figure 12:
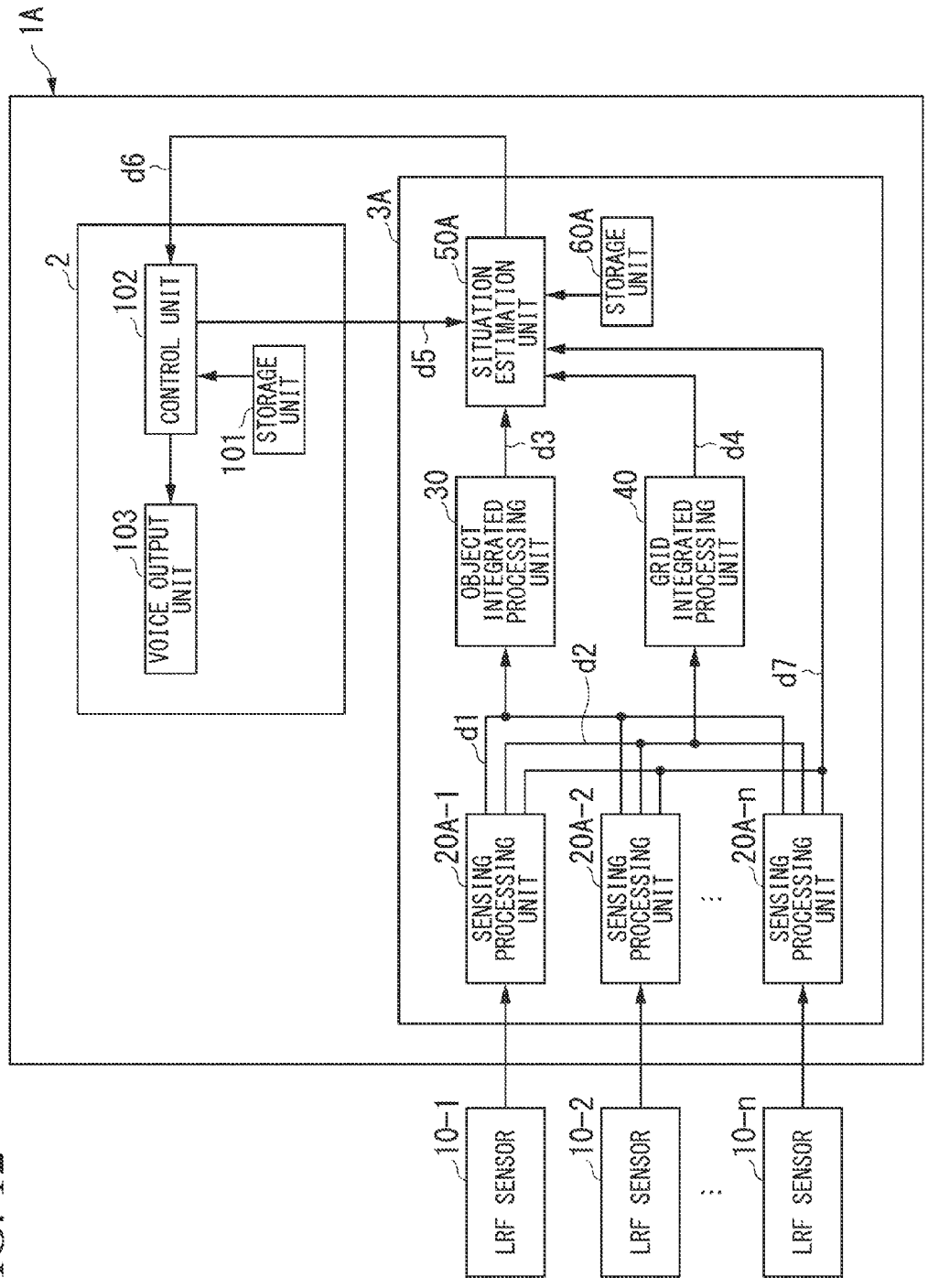
FIG. 12 is a block diagram of the outline of a robot related to a second embodiment of the invention.

FIG. 12 is a block diagram of the outline of a robot 1A related to the present embodiment.

As illustrated in FIG. 12, the robot 1A is configured to include the processing unit 2 and a motion estimation device 3A. The robot 1A is connected to n (n is one or more integers) LRF sensors 10-1 to 10-n by wire or wirelessly. In addition, functional units having the same functions as those of the robot 1 will be designated by the same reference numerals, and the description thereof will be omitted. Additionally, a case where any one of the LRF sensors 10-1 to 10-n is not specified is referred to as LRF sensors 10. In addition, a guide system or the like to be used in an event hall or the like may include the motion estimation device 3.

The motion estimation device 3A includes the n sensing processing units 20A-1 to 20A-n, the object integrated processing unit 30, the grid integrated processing unit 40, a situation estimation unit 50A, and a storage unit 60A. A case where any one of the sensing processing units 20A-1 to 20A-n is not specified is referred to as sensing processing units 20A. Additionally, similar to the robot 1, the respective LRF sensors 10-1 to 10-n are connected to the corresponding sensing processing units 20A-1 to 20A-n by wire or wirelessly. Additionally, the motion estimation device 3A may be configured to include the LRF sensors 10.

The sensing processing units 20A outputs information d7 on distance measurement points, which is input from the LRF sensors 10, to the situation estimation unit 50A.

The sensing processing units 20A sort (cluster) the distance measurement points in every predetermined cycle, using the detection results input from the LRF sensors 10. The sensing processing units 20A calculate the gravity center of each sorted cluster, and use the calculated gravity center as information indicating a position. The sensing processing units 20A extract the maximum value of the height of each sorted cluster and use the extracted maximum value as information indicating height. Then, the sensing processing units 20A associate the information indicating the position of each cluster with the information indicating the height of each cluster to generate the person cluster data d1, and output the generated person cluster data d1 to the object integrated processing unit 30.

Additionally, the sensing processing units 20A sort the distance measurement points into predetermined grids, for example in every predetermined cycle, using the detection results input from the LRF sensors 10. The sensing processing units 20A extract the maximum value of the height of each sorted grid and use the extracted maximum value as information indicating height. Then, the sensing processing units 20A associate the information indicating the position of each grid with the information indicating the height of each grid to generate the grid data d2, and output the generated grid data d2 to the grid integrated processing unit 40.

The situation estimation unit 50A integrates the information d7 on the distance measurement points, which is input from the sensing processing units 20A, based on the trigger signal d5 input from the control unit 102, to generate an average first map (Az) in a period during which hands are lowered, and a second map (B) of a time when hands are raised. In addition, the period during which hands are lowered is a period until a voice signal that urges persons to raise their hands is output, for example, during the times t0 to t1 FIG. 2.

Additionally, the situation estimation unit 50A multiplies the generated average first map (Az) by physique data stored in the storage unit 60A, to generate a third map (AzMax) of the maximum value of a z value in which person's hands can be present, and a fourth map (AzMin) of a minimum value of the z value. The situation estimation unit 50A compares the generated second map, third map, and fourth map with each other, to generate a fifth map (C) in the xy plane to be estimated to be caused by hands being raised. The situation estimation unit 50A performs clustering with respect to the fifth generated map to estimates the number of persons who have raised their hands.

The situation estimation unit 50A estimates the number of persons who have raised their hands, using the results processed by the object integrated processing unit 30, similar to the situation estimation unit 50. Moreover, the situation estimation unit 50A estimates the amount of change of the grid height, using the results processed by the grid integrated processing unit 40, similar to the situation estimation unit 50.

Moreover, the situation estimation unit 50A estimates the amount of change of the grid height caused by the number of persons who have raised their hands or caused by raising their hands, based on predetermined conditions or results input from at least one of the object integrated processing unit 30, the grid integrated processing unit 40, and the sensing processing units 20A, and outputs the estimated results to the control unit 102.

In addition to the first cluster height value, the second cluster height value, the first grid height value, and the second grid height value, person physique data is stored in the storage unit 60A. Person physique data is the ratio of height and radius styloid point of a wrist and the ratio of acromion height and radius styloid point of the wrist. In addition, the person physique data may be stored for each country or district.

Here, assumptions and grounds in hand raising determination in the present embodiment will be described.

(Assumption 1) It is known that person's height and arm length have correlation statistically and are substantially constant irrespective of ages and sexes.

(Assumption 2) Generally, persons raise their hands straight upward.

(Assumption 3) When a district is crowded with persons, persons often raise their hands so as to avoid contacting with raised hands of neighboring persons. That is, persons implicitly set a kind of personal spaces of their hands.

(Assumption 4) Persons have a tendency not to approach others more than the thickness (belly thickness) of a person's trunk.

Figure 13:
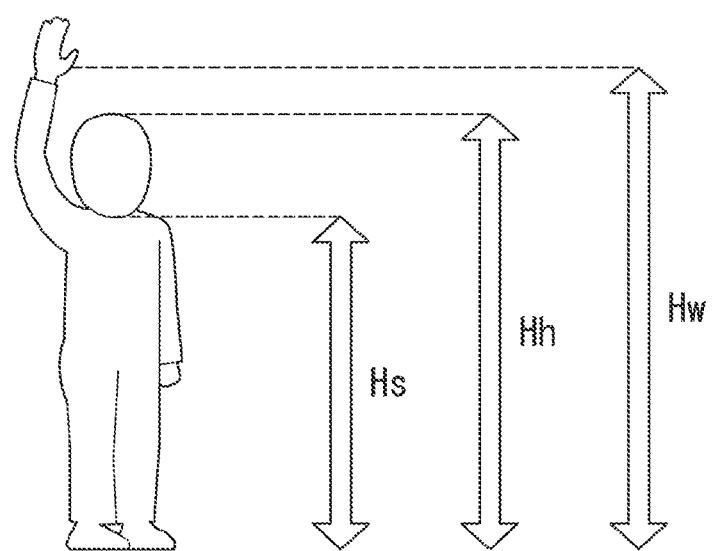
FIG. 13 is a view illustrating the height of person's parts, related to the second embodiment.

FIG. 13 is a view illustrating the height of person's parts, related to the present embodiment. In FIG. 13, acromion height Hs is the height from a floor or the ground to the vicinity of an acromion when a person stands upright. Height Hh is the height from the floor or the ground to the top of a head when the person stands upright. Wrist Hw is the height from the floor or the ground to a radius styloid point of a wrist when the person stands upright and raises their hand.

As in the above-described Assumption 1, there is no considerable difference in the ratio of the wrist Hw to the height Hh and in the ratio of the acromion height Hs to the height Hh. For this reason, the height of the wrist Hw with a hand when the person raises their hand can be known according to an implicit ratio from the height Hh or the acromion Hs irrespective of children or adults.

For this reason, in the present embodiment, when a distance measurement point is between the ratio of the height (=wrist Hw) when a hand has been raised from the height (=height Hh) at the position of the head and the ratio of the height (=wrist Hw) when the hand is raised from the acromion height Hs, it is determined to be a hand.

Figure 14A:
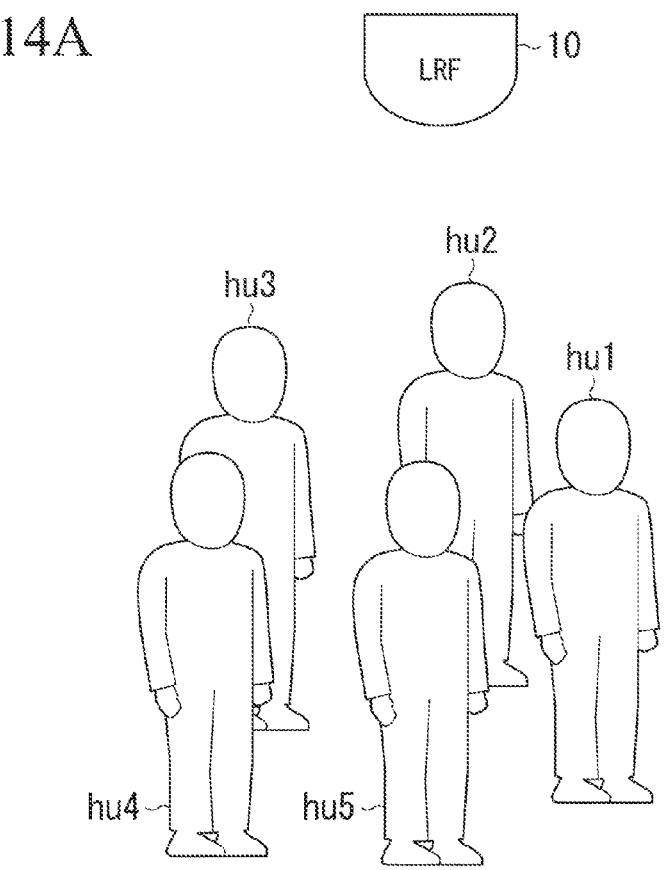
FIG. 14A is an image view where persons lower their hands.
Figure 14B:
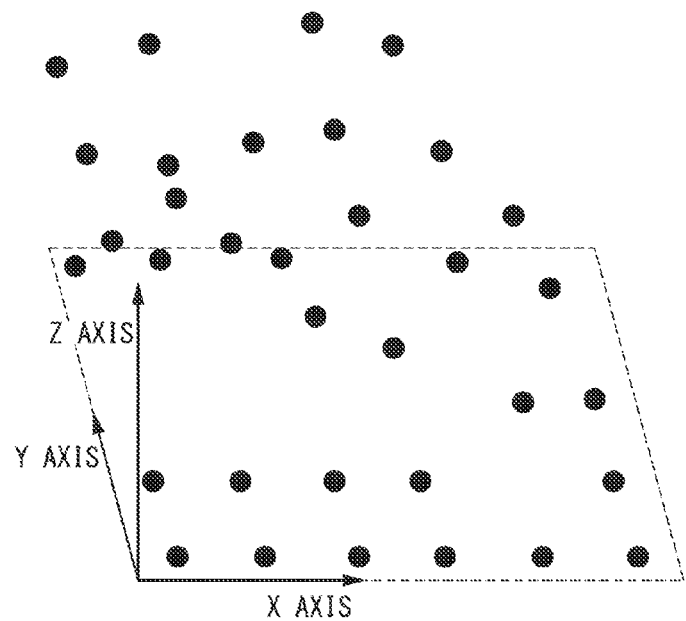
FIG. 14B is a view illustrating an example of a first map of xyz values in a period during which the persons lower their hands, related to the second embodiment.

FIG. 14A is an image view where persons lower their hands. FIG. 14B is a view illustrating an example of the first map of xyz values in a period during which the persons lower their hands, related to the present embodiment. Although only one LRF sensor 10 is illustrated as a representative in the example illustrated in FIG. 14A, n LRF sensors 10 are installed in a ceiling, as in the first embodiment. Additionally, in the example illustrated in FIGS. 14A and 14B, distance measurement points corresponding to five persons (person hu1 to person hu5) are an example when being measured by the LRF sensors 10.

In FIG. 14B, a left-right direction toward a sheet plane is defined as an x-axis direction, a depth direction is defined as a y-axis direction, and a height direction is defined as a z-axis direction. In FIG. 14B, points represent the distance measurement points. Additionally, the first map illustrated in FIG. 14B is a first map (A) formed by distance measurement points acquired by single sampling.

Figure 15A:
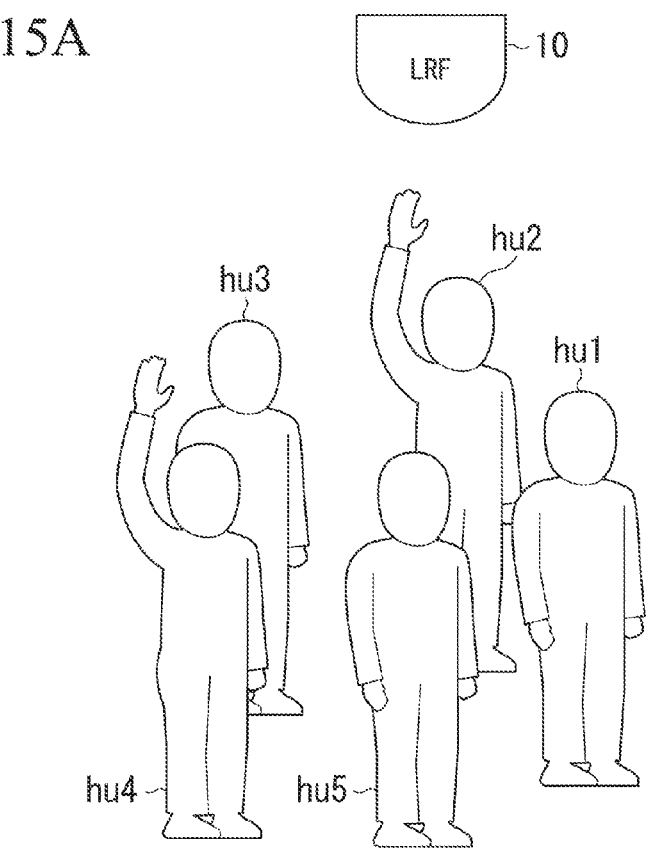
FIG. 15A is an image view where the persons raise their hands.
Figure 15B:
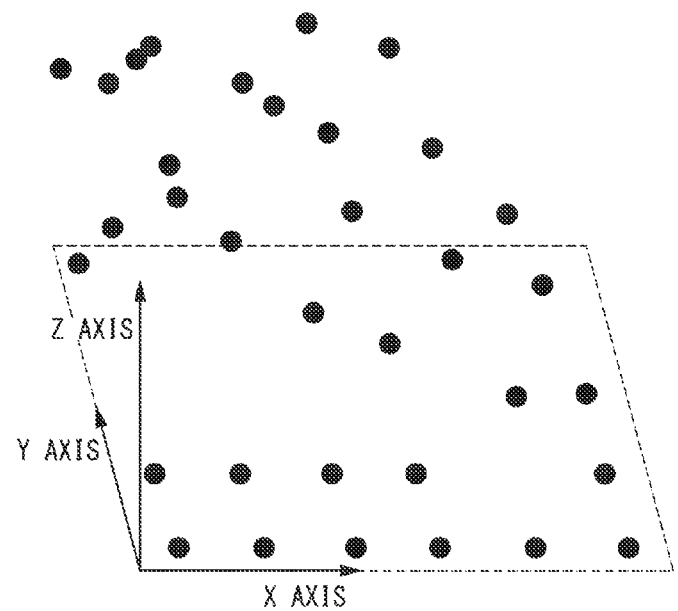
FIG. 15B is a view illustrating an example of a second map of xyz values in a period during which the persons raise their hands, related to the second embodiment.

FIG. 15A is an image view where the persons raise their hands. FIG. 15B is a view illustrating an example of the second map of xyz values in a period during which the persons raise their hands, related to the present embodiment. Additionally, in the example illustrated in FIGS. 15A and 15B, distance measurement points corresponding to the five persons (person hu1 to person hu5) are an example when being measured by the LRF sensors 10.

In FIG. 15B, a left-right direction toward a sheet plane is defined as an x-axis direction, a depth direction is defined as a y-axis direction, and a height direction is defined as a z-axis direction. In FIG. 15B, points represent the distance measurement points. Additionally, the first map illustrated in FIG. 15B is a second map (B) formed by distance measurement points acquired at a predetermined time.

The example illustrated in FIGS. 15A and 15B is an example in which the person hu2 and the person hu4 raise their hands.

Next, the processing that the situation estimation unit 50A performs will be described.

Figure 16:
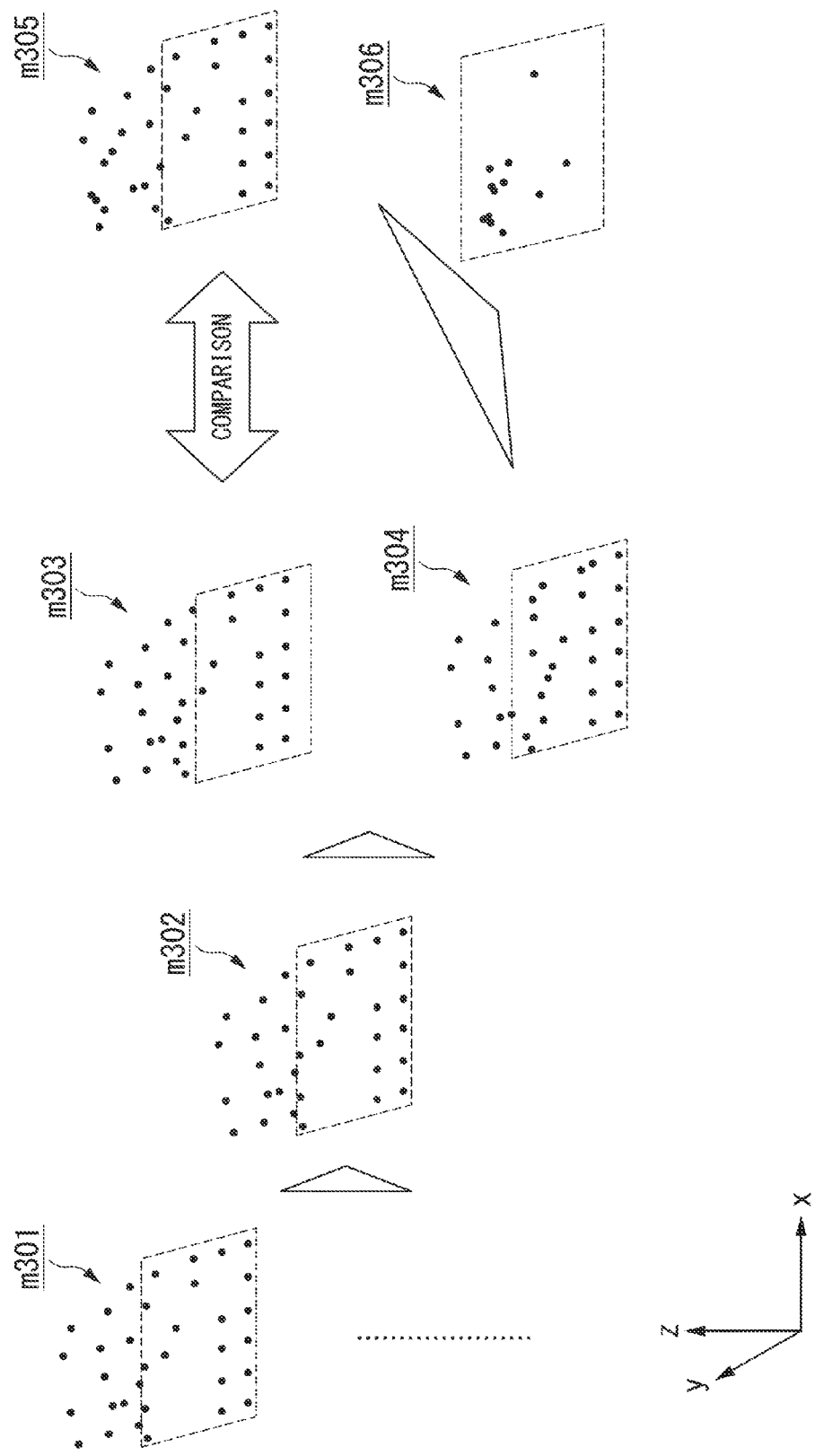
FIG. 16 is a view illustrating processing performed using the first map to a fifth map by a situation estimation unit, related to the second embodiment.
Figure 17:
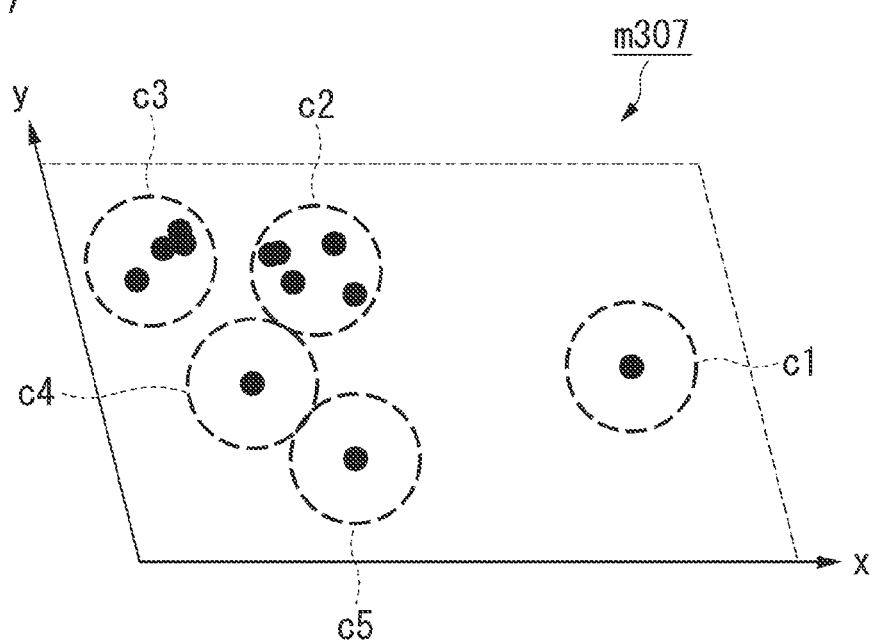
FIG. 17 is a view illustrating processing in which the situation estimation unit performs clustering to estimate the number of persons who have raised their hands, related to the second embodiment.
Figure 18:
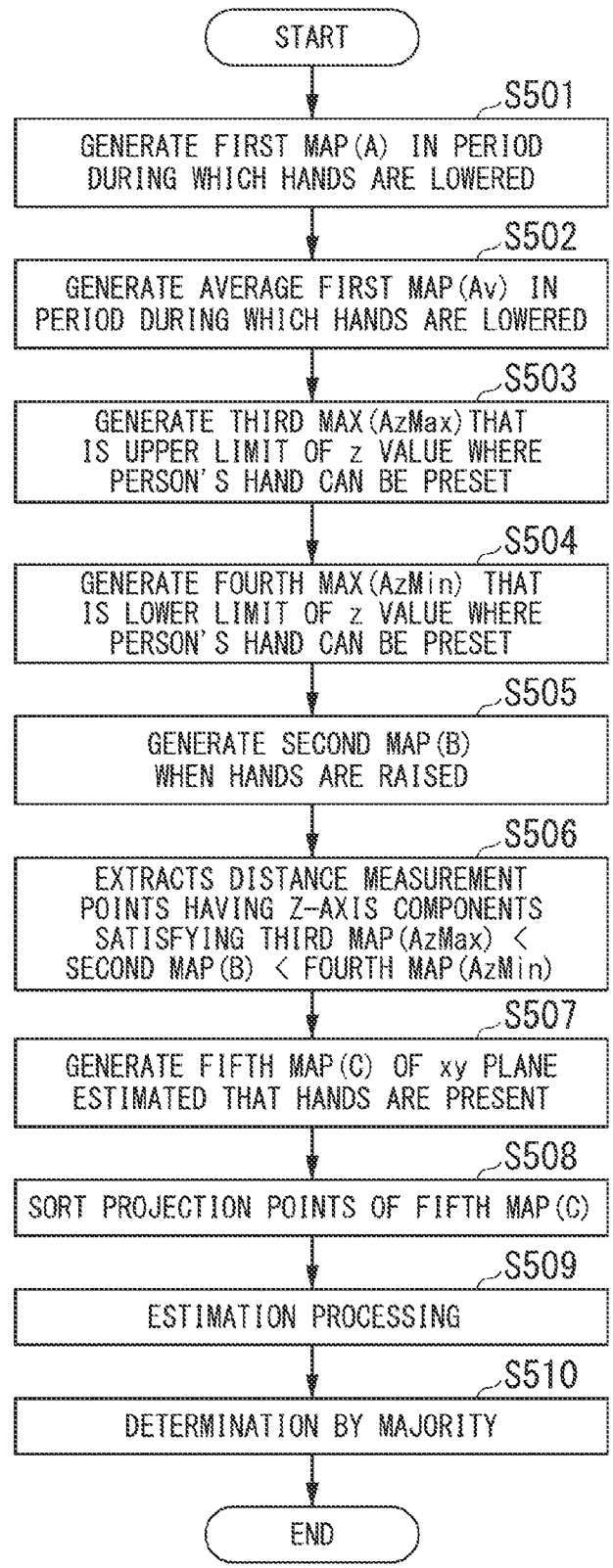
FIG. 18 is a flowchart of a processing procedure of the situation estimation unit, related to the second embodiment.

FIG. 16 is a view illustrating processing performed using the first map to a fifth map by the situation estimation unit 50A, related to the second embodiment. FIG. 17 is a view illustrating processing in which the situation estimation unit 50A performs clustering to estimate the number of persons who have raised their hands, related to the second embodiment. FIG. 18 is a flowchart of a processing procedure of the situation estimation unit 50A, related to the present embodiment. Additionally, in FIG. 16, a left-right direction toward a sheet plane is defined as an x-axis direction, a depth direction is defined as a y-axis direction, and a height direction is defined as a z-axis direction. In FIG. 17, a left-right direction toward a sheet plane is defined as an x-axis direction, and a depth direction is defined as a y-axis direction.

Additionally, although only the processing that the situation estimation unit 50A performs using the first map to the fifth map will be described in the description of the following processing, the situation estimation unit 50A also the processing of Steps S1 to S11 (FIG. 3), similar to the first embodiment.

(Step S501) The situation estimation unit 50A acquires information on distance measurement points in a period during which hands are lowered at every sampling timing from the sensing processing unit 20A, and integrates the acquired distance measurement points. Next, the situation estimation unit 50A generates the first map (A), as in a region view illustrated by reference numeral m301 of FIG. 16, using the integrated distance measurement points. For example, when the number of samplings during a period from the time t0 (FIG. 2) to the time t1 at which the trigger signal d5 showing that the voice signal at the time t1 is output from the control unit 102 is input is ten, ten first maps (A) are generated by the situation estimation units 50A. The situation estimation unit 50A proceeds to the processing of Step S502.

(Step S502) The situation estimation unit 50A generates an average first map (Av), which is the average value map of xyz values in the period during which hands are lowered, as in a region view illustrated by reference numeral m302 of FIG. 16. That is, in Step S502, the situation estimation unit 50A regards all the distance measurement points as values when hands are lowered. The situation estimation unit 50A proceeds to the processing of Step S503.

(Step S503) The situation estimation unit 50A multiplies the values of z-axis components of the average first map (Av) generated in Step S502 by the ratio (Hw/Hs) of the wrist Hw and the acromion height Hs read from the storage unit 60A, to generate the third map (AzMax), as in a region view illustrated by reference numeral m303 of FIG. 16. Hw/Hs is, for example, 1.1. This implies that, when a distance measurement point measured when a hand is lowered is an acromion, an upper limit of the value of a z-axis component of a wrist when the hand is raised is calculated. The situation estimation unit 50A proceeds to the processing of Step S504.

(Step S504) The situation estimation unit 50A multiplies the values of the z-axis components of the average first map (Av) generated in Step S502 by the ratio (Hw/Hh) of the wrist Hw and the height Hh read from the storage unit 60A, to generate the fourth map (AzMin), as in a region view illustrated by reference numeral m304 of FIG. 16. Hw/Hh is, for example, 1.3. This implies that, when a distance measurement point measured when a hand is lowered is the top of a head, an upper limit of the value of a z-axis component of a wrist when the hand is raised is calculated. The situation estimation unit 50A proceeds to the processing of Step S505.

(Step S505) The situation estimation unit 50A acquires information on distance measurement points when hands are raised from the sensing processing unit 20A, to integrate acquired distance measurement points. Next, the situation estimation unit 50A generates the second map (B), as in a region view illustrated by reference numeral m305 of FIG. 16, using the integrated distance measurement points. Also in Step S505, the situation estimation unit 50A regards all the distance measurement points as values when hands are lowered. The situation estimation unit 50A proceeds to the processing of Step S506.

(Step S506) The situation estimation unit 50A extracts distance measurement points having the values of z-axis components, which are greater than the third map (AzMax) generated in Step S503 and smaller than the fourth map (AzMin) generated in Step S504, from the second map (B) generated in Step S505. The situation estimation unit 50A extracts distance measurement points having the values of z-axis components that are considered that hands are present when hands are raised, through this processing. The situation estimation unit 50A proceeds to the processing of Step S507.

(Step S507) The situation estimation unit 50A projects x-axis components and y-axis components included in the extracted distance measurement points on the xy plane, to generate the fifth map (C) formed by projection points as in a region view illustrated by reference numeral m306 of FIG. 16. That is, points in the region view illustrated by reference numeral m306 represent the projection points, and each projection has respective values of an x-axis component and a y-axis component. The situation estimation unit 50A proceeds to the processing of Step S508.

(Step S508) The situation estimation unit 50A sorts (clustering) the projection points of the fifth map (C) generated in Step S507, as in a region view illustrated by reference numeral m307 of FIG. 17. In FIG. 17, the projection points in the regions illustrated by reference numerals c1 to c5 represent sets of projection points sorted into respective clusters. The situation estimation unit 50A proceeds to the processing of Step S509.

(Step S509) The situation estimation unit 50 estimates the number of persons who have raised their hands, based on results sorted in Step S508. In addition, the situation estimation unit 50A determines the sorted clusters to be noise, when the projection points included in the clusters is equal to or less than a predetermined value, based on the measurement performance of the LRF sensors 10. In the example illustrated in FIG. 17, when there is one projection point, the situation estimation unit 50A determines that the projection point is noise. For this reason, the projection points of the regions included in the reference numerals c1, c4, and c5 are determined to be noise. Next, the situation estimation unit 50A estimates the number of persons who have raised their hands, based on the results determined in Step S509. In the example illustrated in FIG. 17, the clusters that are determined that hands are raised are the projection points of the regions included in the reference numerals c2 and c3. The motion estimation device 3A repeats Steps S501 to S509 until predetermined questions are posed a predetermined number of times, based on the scenario information.

(Step S510) The situation estimation unit 50 performs a majority decision, based on the estimated results for each question estimated in Step S509 after predetermined questions are posed a predetermined number of times, based on the scenario information. Specifically, the situation estimation unit 50 selects at least one of the results processed by the object integrated processing unit 30, the results processed by the grid integrated processing unit 40, and the results processed using the first map to the fifth map, according to set conditions. The situation estimation unit 50A selects a corresponding question according to the estimated results of the number of persons who have raised their hands for each question.

The processing of the hand-raising detection is ended above.

As described above, in the motion estimation device 3A of the present embodiment, the situation estimation unit (for example, the situation estimation unit 50) calculates the hand raising presence ranges (for example, the third map (AzMax) to the fourth map (AzMin)) that are ranges in the height direction which are calculated based on the person physique data and the distances acquired by the acquisition units (for example, the sensing processing unit 20) in a second period (for example, the period of the times t0 to t1) during which persons do not raise their hands, and in which persons' hands are present when the persons have raised their hand, extracts the distances (for example, the fifth map(C)) which are present in the calculated hand raising presence ranges and are acquired by the acquisition units at the first time (for example, the time t3 or the time t5) or in the first period (for example, the period p4 from the time t3 to the time t4 or the period p6 from the time t4 to the time t5), and estimates persons' reactions based on the extracted distances.

By virtue of this configuration, since it is not necessary to specify individuals, the motion estimation device 3A of the present embodiment can estimate the number of persons that have raised their hands even if a region crowded with persons is present. Additionally, according to the present embodiment, since synchronization and addition are performed at a predetermined time at which hands are lowered even if there is any fluctuation in measurement values due to the variation of the measurement results of the LRF sensors 10, robustness can be improved.

In addition, although an example in which the processing unit 2 generates the trigger signal d5 based on the scenario information stored in the storage unit 101 has been described in the first embodiment and the second embodiment, the invention is not limited to this.

For example, a presenter may be a person. In this case, the presenter pushes an operation switch (not illustrated) at a timing at which a question is posed toward persons who are present in a detection region, thereby outputting the trigger signal d5 to the motion estimation device (3 or 3A). For example, the presenter may push a button A when a question that urges raising hand is posed, may push a button B when a voice that urges raising hand, and may push a button C when all questions are completed. The operation switch may outputs the trigger signal d5 according to the pushed button to the motion estimation device (3 or 3A). Even in this case, the motion estimation device (3 or 3A) can perform the above-described processing in a predetermined period and at a predetermined time according to the input trigger signal d5, thereby performing a processing of a majority vote.

In addition, the detection region described in the first embodiment and the second embodiment is not limited to, for example, one hall. A plurality of the detection regions may be provided. In this case, the situation estimation unit (50 or 50A) or the control unit 102 may estimate, for example, the number of persons who have raised their hands for each hall or the amount of change of the grid height for each hall, and the motion estimation device (3 or 3A) determines the results obtained in all the halls so as to perform a processing of a majority vote. Also, these halls may be separated from each other. When the halls are separated from each other, a plurality of the motion estimation devices (3 or 3A) may transmit processing results to one motion estimation device (3 or 3A), for example via a wireless circuit, and the motion estimation device (3 or 3A) that have received all the processing results may perform processing. The processing results received by the motion estimation device (3 or 3A) may be, for example, the information on distance measurement points obtained by the LRF sensors 10 or may be the person data d3, the grid height information d4, and the information d7 on the distance measurement points, which are processed by the motion estimation devices (3 or 3A) that are installed in the respective halls.

In this way, when the robots (1, 1A) are installed in the plurality of separated halls and synchronously perform processing, voice signals from the robots (1, 1A) may be those matched with countries or districts.

In addition, although an example in which persons have raised or lowered their hands with respect to questions has been described in the first embodiment and the second embodiment, the invention is not limited to this. For example, even if a plurality of persons that are present in a detection region have raised or lowered placards or the like to a height higher than the tops of heads, the above-described processing can perform a majority vote processing.

Additionally, persons may raise or lower portable terminals that can perform position detection, such as acceleration sensors or global positioning systems (GPS). Also, the motion estimation device (3 or 3A) may receive information that the portable terminals transmit, determine whether or not persons have raised their hands, using also the received information, and estimate person's reactions, such as the number of persons who have raised their hands.

In addition, in the first embodiment and the second embodiment, although an example where the processing is performed at the timing described in FIG. 2 has been described, the invention is not limited to this.

FIG. 19 is a view illustrating a time when people are being urged to stop raising their hand, a first time, and a first period.

A period from a time t101 to a time t102 is a period where the voice output unit 103 outputs a voice signal to urge people to stop raising their hand "Please put down your hands".

A time t4 is the time when people are urged to stop raising their hand. The time when people are urged to stop raising their hand may be within the period from the time t101 to the time t102 where the voice signal to urge people to stop raising their hand is output. The time when people are urged to stop raising their hand may be, for example, a timing when the voice signal to urge people to stop raising their hand is started to be output or a timing when the voice signal has been finished. Alternatively, the time when people are urged to stop raising their hand may be, for example, a timing of "(Please) put (down)" in the voice signal or a timing of "your" in the voice signal.

Each of a time t3 and a time t5 is a first time which is set on the basis of the time when people are urged to stop raising their hand.

In addition, each of a period p4 from the time t3 to the time t4 and a period p6 from the time t4 to the time t5 is a first period which is set on the basis of the time when people are urged to stop raising their hand.

For example, similarly to the first embodiment, the situation estimation unit 50 estimates the number of persons raising their hands to compare the height detected by using the data in the period before the period p4 from the time t4 (for example an average value, a maximum value, a statistical processed value) and the height detected by using the data at the time t5 after the period p6 from the time t4.

Alternatively, the situation estimation unit 50 may estimate the number of persons raising their hands to compare the height detected by using the data at the time t3 and the height detected by using the data at the time t5.

Alternatively, the situation estimation unit 50 may estimate the number of persons raising their hands to compare the height detected by using the data at the time t3 and the height detected by using the data in the period p6 (for example an average value, a minimum value, a statistical processed value).

Alternatively, the situation estimation unit 50 may estimate the number of persons raising their hands to compare the height detected by using the data in the period p4 and the height detected by using the data in the period p6 (for example an average value, a minimum value, a statistical processed value).

As described above, the situation estimation unit 50 may estimate the number of persons raising their hands to compare the height either at a time or in a period where it is estimated that persons put up their hands and the height either at a time or in a period where it is estimated that persons put down their hands.

In addition, programs for realizing the functions of the motion estimation device (3 or 3A) in the invention may be recorded on the computer-readable recording media, and a computer system may be made to read in and execute the programs recorded on this recording media, thereby performing the estimation of hand raising. In addition, the "computer system" herein includes OS or hardware such as peripheral devices. Additionally, it is supposed that the "computer system" also includes a WWW system equipped with a homepage-providing environment (or display environment). Additionally, the "computer-readable recording media" mean portable media, such as a flexible disk, a magnetic-optical disk, ROM, and CD-ROM, and storage devices, such as a hard disk, built in the computer system. Moreover, the "computer-readable recording media" include recording media that hold the programs in a predetermined time, like a volatile memory (RAM) inside the computer system serving as a server or a client in cases where the programs are transmitted via networks, such as the Internet, or communication lines, such as telephone lines.

Additionally, the above programs may be transmitted from the computer system that stores the programs in a storage device or the like via a transmission media to other computer systems by means of transmission waves in the transmission media. Here, the "transmission media" that transmits the programs means media having the function of transmitting information, like networks (communication networks), such as the Internet, or communication lines, such as and a telephone line. Additionally, the above programs may be provided for realizing some of the aforementioned programs. Moreover, the above programs may be those which can realize the aforementioned functions in combination with the programs already recorded in the computer system, that is, a so-called differential file (differential program).

What is claimed is:

1. A motion estimation device comprising:
a sensor configured to detect an object; and
a processor, wherein the processor includes:
an acquisition unit configured to acquire a distance between the sensor and the object;
a situation estimation unit configured to estimate two or more persons' reactions based on a distance acquired by the acquisition unit at a first time that is set based on a time when the two or more persons are being urged to stop raising their hands, wherein the situation estimation unit estimates one of the two or more persons' reactions based on a distance acquired by the acquisition unit in a first period that is set based on a time when the two or more persons are being urged to stop raising their hands:
an identifier applying unit configured to detect a person of the two or more persons based on a distance acquired by the acquisition unit and applies an identifier to the detected person, wherein the situation estimation unit extracts distances of the identifier in a height direction at the first time and in the first period by using the distance of the person to which the identifier is applied by the identifier applying unit, and compares the extracted distances of the identifier in the height direction at the first time and in the first period with each other, thereby estimating at least one of the two or more persons' reactions;

a region distance processing unit configured to divide a predetermined range, in which at least one of the two or more persons' reactions is to be estimated, into one or more regions and obtain a distance of each of the divided regions based on a distance acquired by the acquisition unit, wherein the situation estimation unit estimates at least one of the two or more persons' reactions according to at least one distance out of the distance of the person to which the identifier is applied by the identifier applying unit and the distance obtained by the region distance processing unit; and a distance tracking unit configured to track the distances of the identifiers applied by the identifier applying unit, wherein the situation estimation unit refers to the number of the identifiers given by the distance tracking unit, estimates at least one of the two or more persons' reactions, using the distance obtained by the region distance processing unit, when the number of the identifiers that cannot be tracked in a predetermined period exceeds a predetermined value, and estimates at least one of the two or more persons' reactions, using the distance obtained by the identifier applying unit, when the number of the identifiers that cannot be tracked in the predetermined period is smaller than a predetermined value.

2. The motion estimation device according to claim 1, wherein the situation estimation unit extracts distances of an object in a height direction at the first time and in the first period, and compares the extracted distances in the height direction at the first time and in the first period with each other, thereby estimating at least one of the two or more persons' reactions.

3. The motion estimation device according to claim 1, wherein the region distance processing unit extracts distances of each of the divided regions in a height direction at the first time and in the first period, and compares values based on the extracted distances of each of the divided regions in the height direction at the first time and in the first period, thereby estimating at least one of the two or more persons' reactions.

4. The motion estimation device according to claim 3, wherein the values based on the distances of each of the divided regions in the height direction are average values of distances in the height direction in a region from which the distances of each of the divided regions in the height direction at the first time and in the first period are extracted.

5. The motion estimation device according to claim 1, wherein the first time or the first period is set based on a time when a change of the distance measured by the region distance processing unit becomes smaller than a predetermined value.

6. The motion estimation device according to claim 1, wherein the situation estimation unit calculates a hand raising presence range that is a range in the height direction, the hand raising presence range being calculated based on person physique data and a distance acquired by the acquisition unit in a second period during which a person of the two or more persons does not raise his/her hand, and being where a person's hand is present when the person has raised his/her hand, extracts a distance which is present in the calculated hand raising presence range and is acquired by the acquisition unit at the first time or in the first period, and estimates at least one of the two or more persons' reactions based on the extracted distance.

7. The motion estimation device according to claim 1, wherein the person's reaction is whether or not a person of the two or more persons raises his/her hand, and wherein the situation estimation unit estimates persons' reactions at multiple times and performs a majority decision based on the results estimated at the multiple times.

8. The motion estimation device according to claim 1, further comprising:

a sensor that performs measurement of a distance between itself and an object in a predetermined range.

9. A robot comprising:

an output unit configured to output a signal indicating that a person of the two or more persons is being urged to stop raising his/her hand; and the motion estimation device according to claim 1.

10. A motion estimation method comprising:

a sensing procedure in which a sensor detects an object;

an acquisition procedure in which an acquisition unit implemented on a processor acquires a distance between the sensor and the object;

a situation estimation procedure in which a situation estimation unit implemented on the processor estimates two or more persons' reactions based on a distance acquired by the acquisition procedure at a first time that is set based on a time when the two or more persons are being urged to stop raising their hands, wherein the situation estimation procedure estimates one of the two or more persons' reactions based on a distance acquired by the acquisition procedure in a first period that is set based on a time when the two or more persons are being urged to stop raising their hands;

an identifier applying procedure in which an identifier applying unit implemented on the processor detects a person of the two or more persons based on a distance acquired by the acquisition unit and applies an identifier to the detected person, wherein the situation estimation procedure extracts distances of the identifier in a height direction at the first time and in the first period by using the distance of the person to which the identifier is applied by the identifier applying procedure, and compares the extracted distances of the identifier in the height direction at the first time and in the first period with each other, thereby estimating at least one of the two or more persons' reactions;

a region distance processing procedure in which a region distance processing unit implemented on the processor divides a predetermined range, in which at least one of the two or more persons' reactions is to be estimated, into one or more regions and obtains a distance of each of the divided regions based on a distance acquired by the acquisition unit, wherein the situation estimation procedure estimates at least one of the two or more persons' reactions according to at least one distance out of the distance of the person to which the identifier is applied by the identifier applying procedure and the distance obtained by the region distance processing procedure; and a distance tracking procedure in which a distance tracking unit implemented on the processor tracks the distances of the identifiers applied by the identifier applying procedure, wherein the situation estimation procedure refers to the number of the identifiers given by the distance tracking procedure, estimates at least one of the two or more persons' reactions, using the distance obtained by the region distance processing procedure, when the number of the identifiers that cannot be tracked in a predetermined period exceeds a predetermined value, and estimates at least one of the two or more persons' reactions, using the distance obtained by the identifier applying procedure, when the number of the identifiers that cannot be tracked in the predetermined period is smaller than a predetermined value.

* * * * *